Inventors:
William V. Goodhue
and Robert E. Morton
By [signature]
Attorneys.

Sept. 18, 1956　　　W. V. GOODHUE ET AL　　　2,763,443
AUTOMATIC BOBBIN WINDING MACHINE
Filed April 15, 1953　　　　　　　　　　　17 Sheets-Sheet 2

Inventors:
William V. Goodhue
and Robert E. Morton
By
Attorneys.

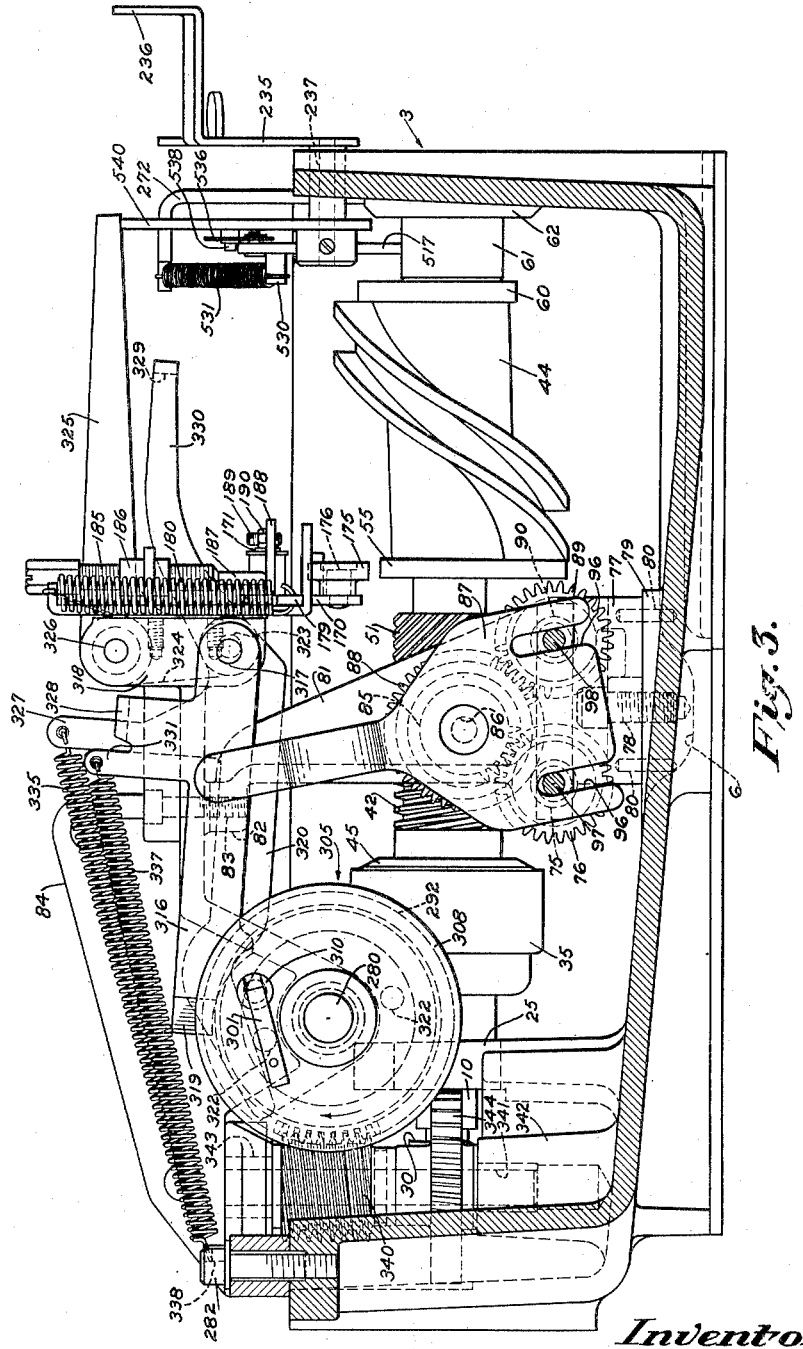

Sept. 18, 1956 W. V. GOODHUE ET AL 2,763,443
AUTOMATIC BOBBIN WINDING MACHINE
Filed April 15, 1953 17 Sheets-Sheet 4
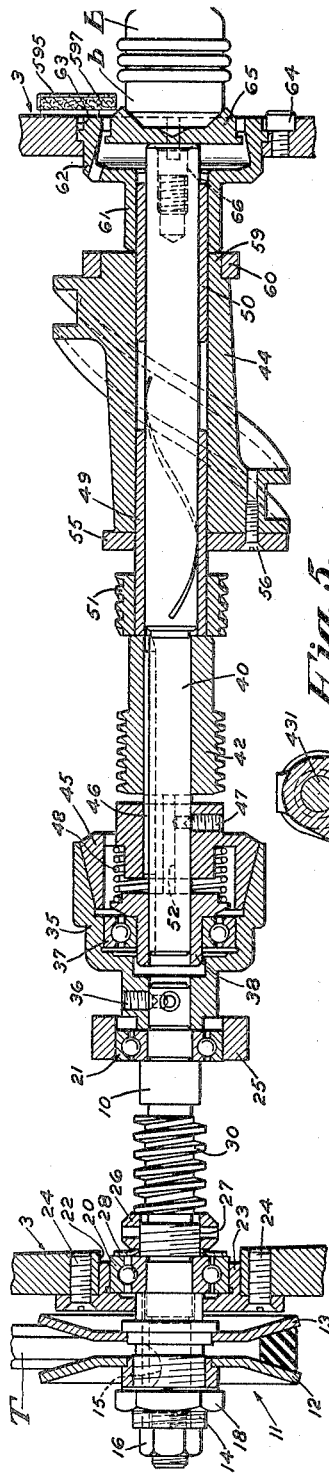
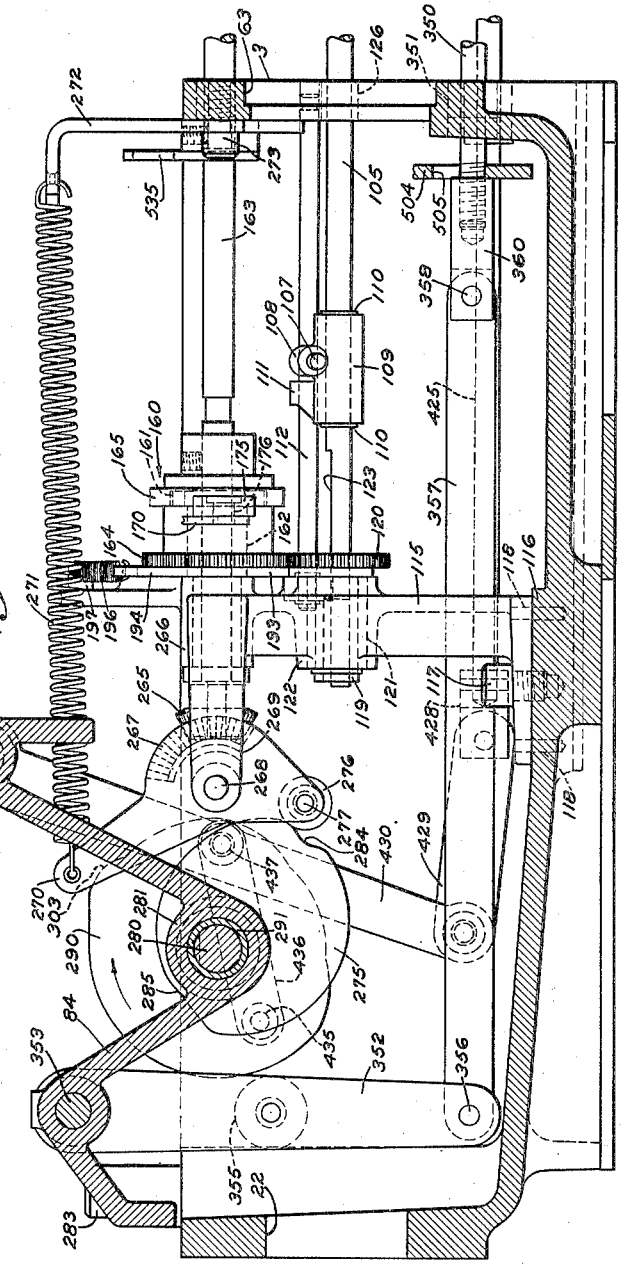
Inventors:
William V. Goodhue
and Robert E. Morton
By
Attorneys.

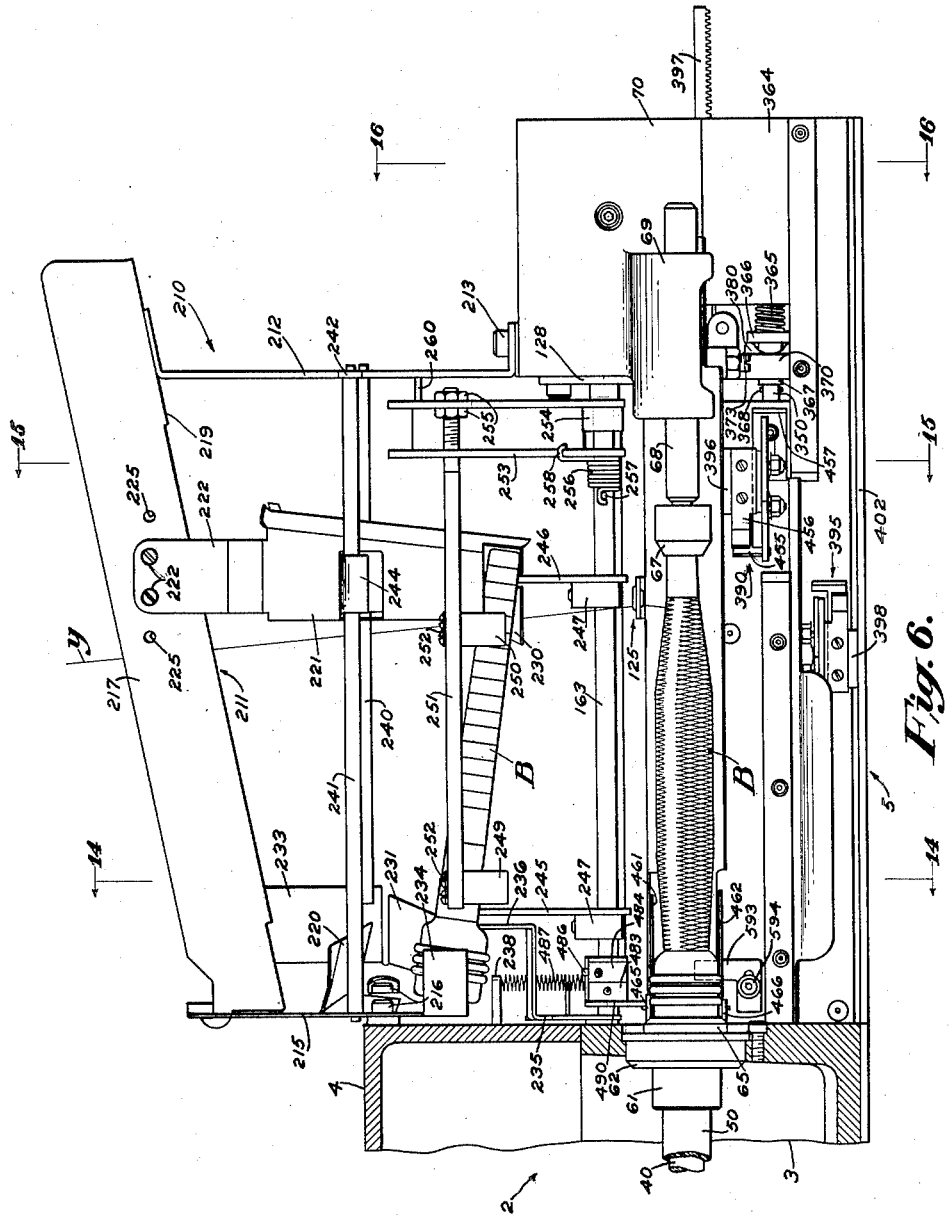

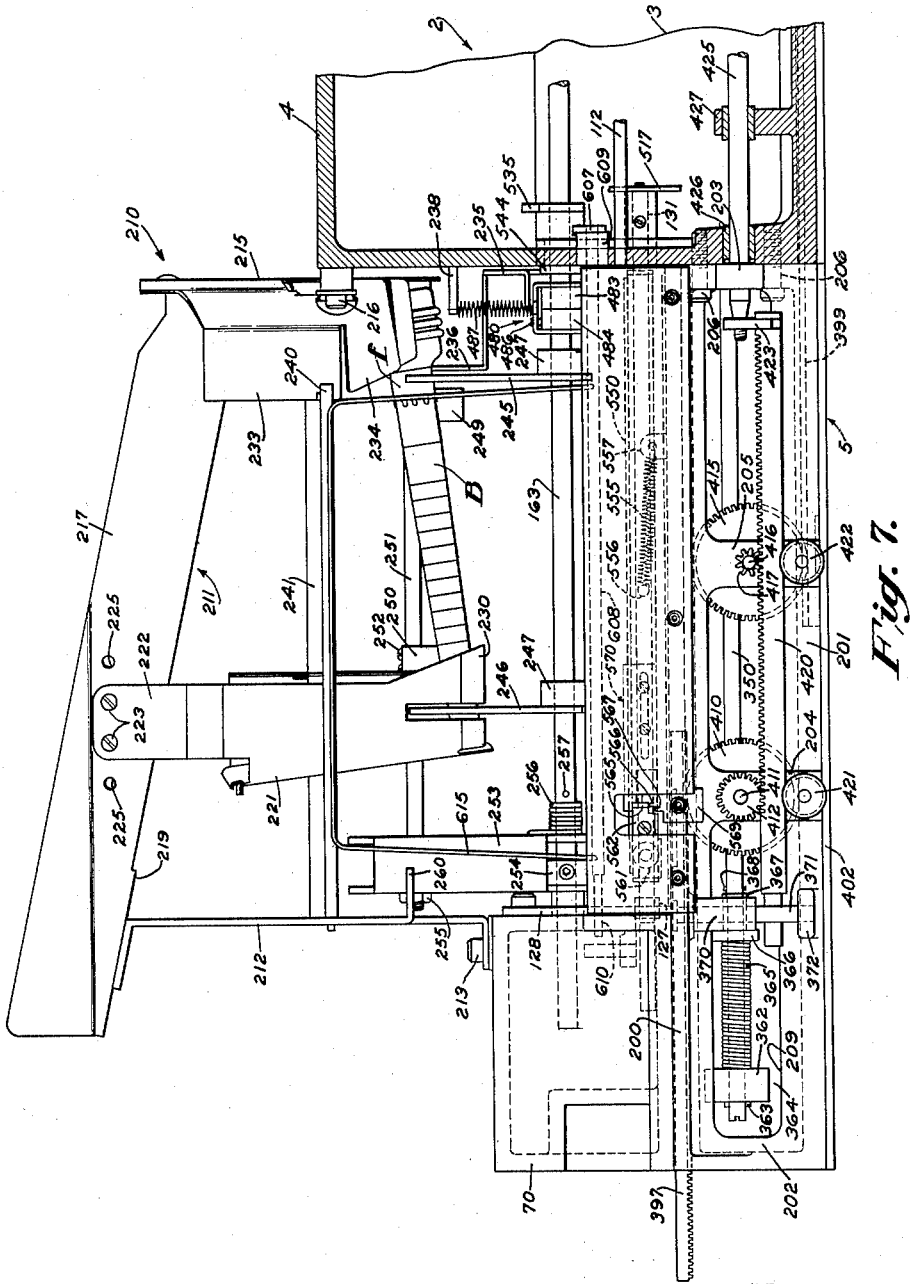

Sept. 18, 1956  W. V. GOODHUE ET AL  2,763,443
AUTOMATIC BOBBIN WINDING MACHINE
Filed April 15, 1953  17 Sheets-Sheet 7
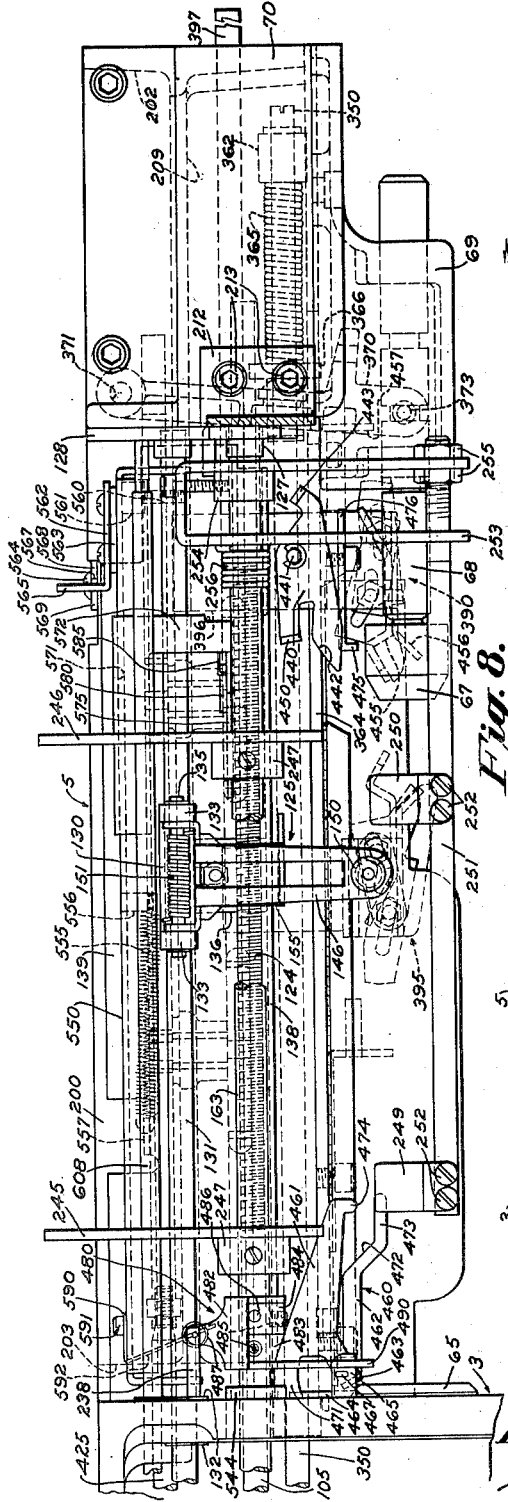
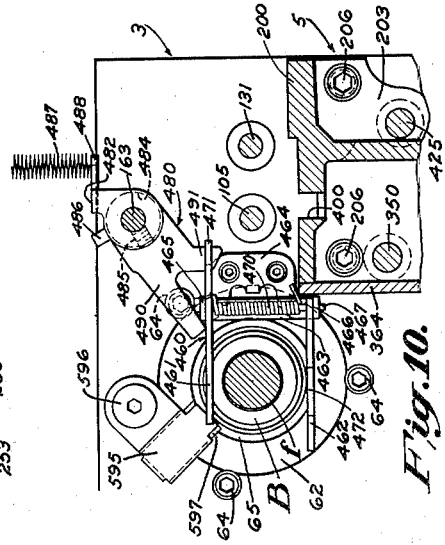
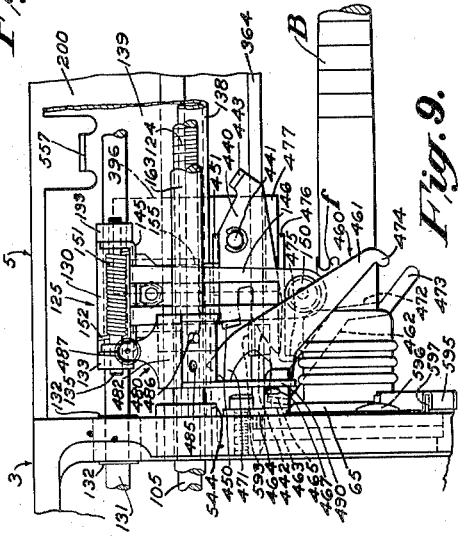
Inventors:
William V. Goodhue
and Robert E. Morton
By
Attorneys.

Sept. 18, 1956     W. V. GOODHUE ET AL     2,763,443
AUTOMATIC BOBBIN WINDING MACHINE
Filed April 15, 1953     17 Sheets-Sheet 8
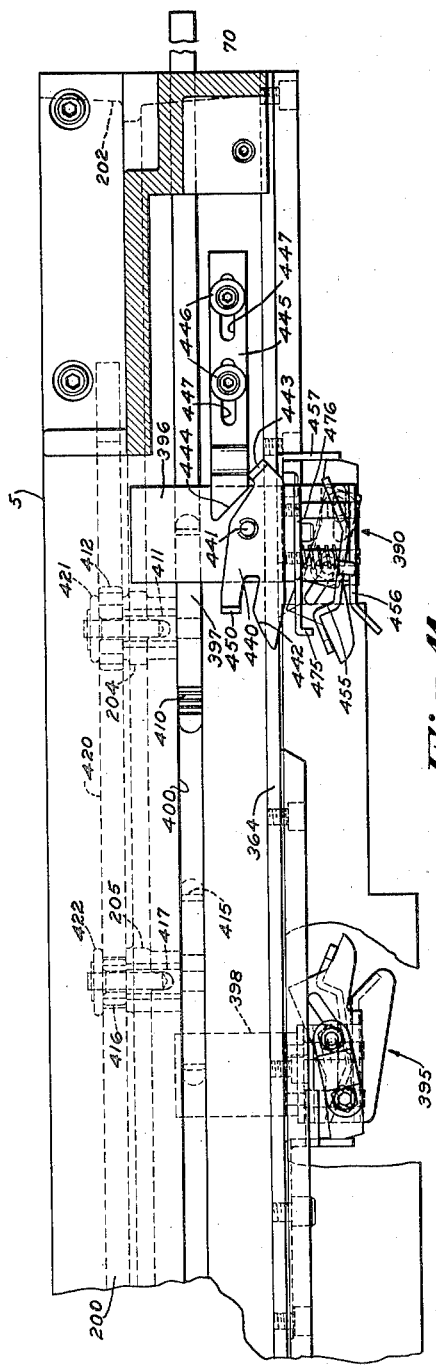
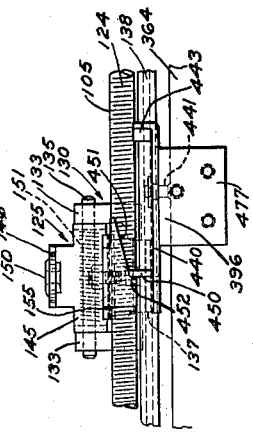
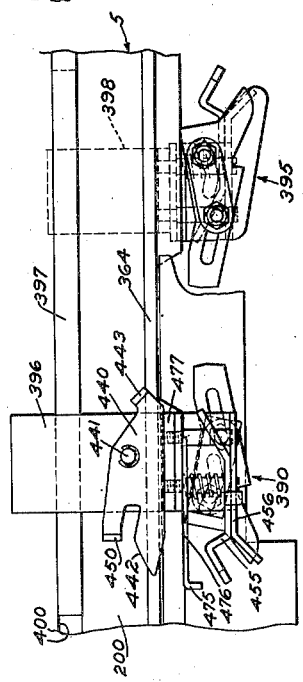
Inventors:
William V. Goodhue
and Robert E. Morton
By *[signature]*
Attorneys.

Sept. 18, 1956 W. V. GOODHUE ET AL 2,763,443
AUTOMATIC BOBBIN WINDING MACHINE
Filed April 15, 1953 17 Sheets-Sheet 9
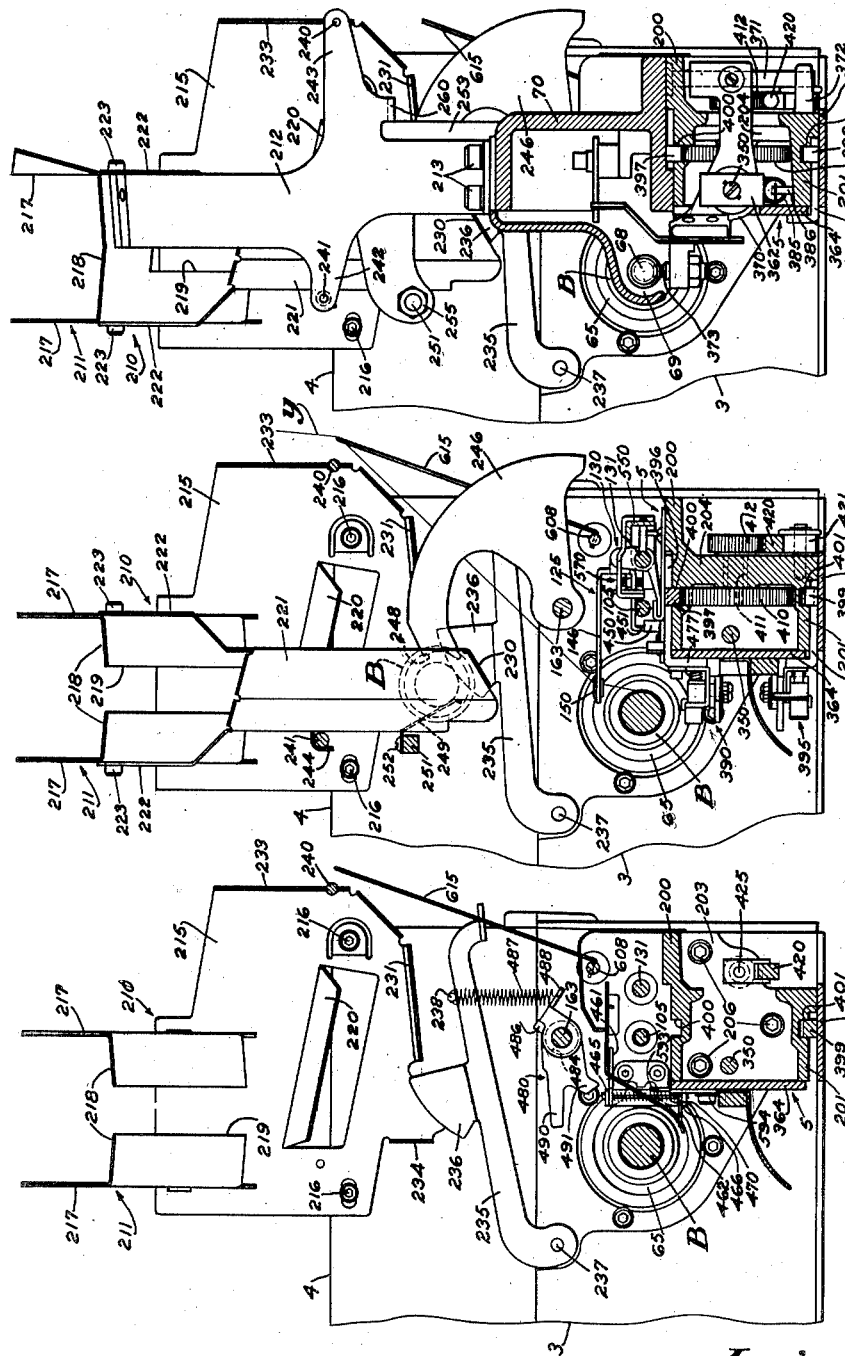
Inventors:
William V. Goodhue
and Robert E. Morton
By *Pennington White*
Attorneys.

Sept. 18, 1956  W. V. GOODHUE ET AL  2,763,443
AUTOMATIC BOBBIN WINDING MACHINE
Filed April 15, 1953  17 Sheets-Sheet 11

Inventors:
William V. Goodhue
and Robert E. Morton
By
Attorneys.

Sept. 18, 1956  W. V. GOODHUE ET AL  2,763,443
AUTOMATIC BOBBIN WINDING MACHINE
Filed April 15, 1953  17 Sheets-Sheet 12

Inventors:
William V. Goodhue
and Robert E. Morton
By
Attorneys.

Inventors:
William V. Goodhue
and Robert F. Morton
By their Attorneys:

Sept. 18, 1956  W. V. GOODHUE ET AL  2,763,443
AUTOMATIC BOBBIN WINDING MACHINE
Filed April 15, 1953  17 Sheets-Sheet 14

Inventors:
William V. Goodhue
and Robert E. Morton
By their Attorneys

Inventors:
William V. Goodhue
and Robert E. Morton
By their Attorneys.

United States Patent Office 2,763,443
Patented Sept. 18, 1956

2,763,443

AUTOMATIC BOBBIN WINDING MACHINE

William V. Goodhue, North Kingstown, and Robert E. Morton, Warwick, R. I., assignors to Universal Winding Company, Boston, Mass., a corporation of Massachusetts Application April 15, 1953, Serial No. 349,033

41 Claims. (Cl. 242—27)

This application is a continuation in part of our prior application, Serial No. 159,814, filed May 3, 1950, and issued into United States Letters Patent No. 2,638,936, May 19, 1953.

The invention of our prior application consists in an automatic winding machine for producing weft or filling bobbins used in the shuttles of automatic looms. More specifically, the invention resides in an automatic bobbin winder for continuously winding filling bobbins, doffing the completed bobbins therefrom, and supplying empty bobbins to the winding means during a complete operating cycle.

The machine of the present invention is generally similar to that disclosed in our prior application in which the automatic winding mechanism is built into a loom for operation in conjunction with the weaving mechanism and the weft-replenishing or filling-changing means thereof. The present machine, however, consists more especially in novel and improved means for driving and otherwise operating the automatic mechanism of the winder which functions in a cycle to wind a bobbin; doff the completed bobbin from the winding spindle; replace it with a fresh empty bobbin; retrieve the end of the yarn from the wound bobbin and connect it to the freshly donned empty bobbin; and thereafter take the end trailing from the completed bobbin and sever it therefrom as said bobbin is delivered from the winding machine.

One object of the invention is to provide improved means for initiating the operation of the cycling mechanism which performs the functions explained above and a generally more efficient machine for the purposes specified.

Another object is to provide automatic cycling mechanism with means for controlling it for prompt and efficient action.

Further objects and advantages of the invention are set forth in the following specification which describes a preferred form of construction of the winding mechanism and its cooperating bobbin-donning and -doffing means as illustrated by the accompanying drawings.

In the drawings:

Fig. 3 is a longitudinal sectional view through the lower section of the casing showing a portion of the driving means for the winding elements and certain parts of the cycling mechanism which operates the donning and doffing functions of the winder;

Fig. 4 is a similar sectional view of the casing showing certain other parts of the automatic cycling mechanism and the control therefor;

Fig. 5 is an enlarged longitudinal sectional view of the driving means for the winding spindle, the cam for traversing the yarn-guide, and the clutch for controlling the drive for these elements;

Fig. 6 is a side elevational view of the forward or outboard structure of the machine showing the mounting for the winding bobbin, the hopper for empty bobbins, and parts of the mechanism for donning empty bobbins;

Fig. 7 is a similar elevational view looking in the opposite direction from that of Fig. 5 and illustrating the means for actuating the traveling yarn-clip to retrieve the end of the yarn from a completed bobbin and attach it to a fresh empty bobbin and the clip for severing the end from the completed bobbin;

Fig. 8 is a general plan view of the outboard winding mechanism showing the traversing yarn-guide, the yarn-retrieving clip, the end-serving clip, and the bunch-building device;

Fig. 9 is a detailed plan view of the bunch-builder for winding a reserve length of yarn on the bobbin;

Fig. 10 is an end view of the bunch-builder showing the latching-means for retaining it in operative relationship;

Fig. 11 is a plan view showing the traveling yarn-retriever clip which takes the yarn end from the completed bobbin and carries it back for attachment to a new empty bobbin, and the secondary yarn-clip which severs the end from the completed bobbin, each clip being illustrated as set for receiving the end of the yarn;

Fig. 12 is a detailed plan view of said yarn-clips shown with their jaws closed for gripping the yarn;

Fig. 13 is a front view of the yarn-guide shown in engagement with the screw-threads of the traverse-rod by which it is reciprocated and advanced for building the bobbin in stepped overlying conical layers and illustrating the means for returning the guide to first position;

Fig. 14 is a view looking toward the forward end of the casing and showing a portion of the hopper for empty bobbins with the outboard bracket extending from the casing illustrated in section on line 14—14 of Fig. 6;

Fig. 15 is a similar view part-sectional on line 15—15 of Fig. 6 and showing a portion of the bobbin-donning means and an end view of the yarn-guide;

Fig. 16 is a similar view part-sectional on line 16—16 of Fig. 6 and showing certain elements of the bobbin-doffing means;

Figures 31, 32:
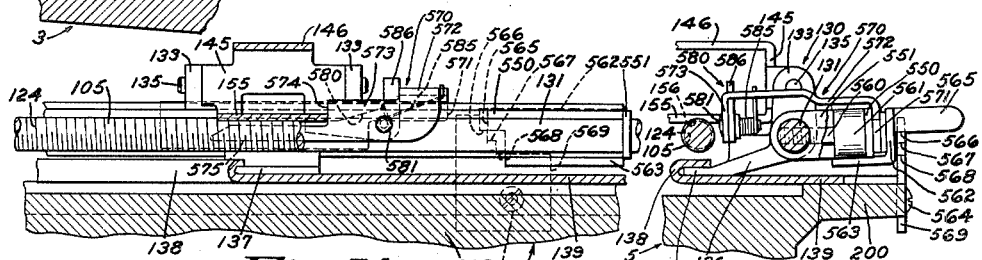
Fig. 31 is a view of the trip-mechanism actuated by the yarn-guide at the end of its advance to release the detent-means and initiate the operation of the cycling mechanism.
Fig. 32 is an end view of the same.
Figures 33, 34:
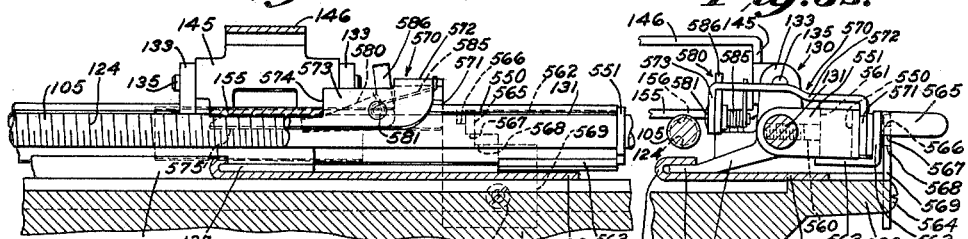
Figures 35, 36:
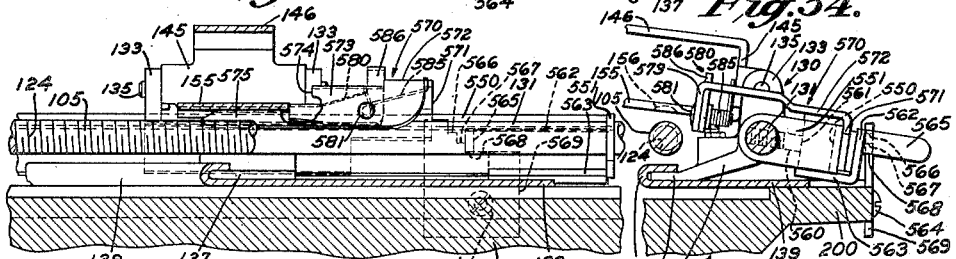

Figs. 33 and 34 are views similar to Figs. 31 and 32 showing the trip-mechanism as partially actuated; and Figs. 35 and 36 are similar views showing the trip-mechanism at the completion of its actuation to release the yarn-guide from the traverse-bar and rotate the control-rod for releasing the detent-means.

General organization of machine

In general, the present machine is constructed with a box-like casing 2 of rectangular shape comprising a bottom section 3 surmounted by a cover section 4. Substantially all of the driving means and the cycling mechanism for controlling the automatic operation of the winding means, bobbin-doffing means, and donning means are contained within the composite casing 2. The bobbin winding means and the donning and doffing means are supported by an outboard bracket 5 extending horizontally from the forward end of the casing 2. The section 3 of the casing 2 has a sloping bottom for draining oil into a depression 6 forming a sump for lubricant, see Fig. 22.

The cover section 4 of the casing 2 may be employed for mounting an electric motor M for driving the mechanism of the machine through the means of a belt enclosed in a protective casing 7 (Fig. 1) fastened to the end of the casing 2. Fig. 5 shows the horizontal drive-shaft 10 of the machine with the parts it carries illustrated in section, including an adjustable pulley 11 at one end which is drivingly belted to a pulley 9 on the rotor shaft of the motor M. Suffice it to state that the driving pulley 11 is made in two halves 12 and 13 with a V-shaped opening therebetween for receiving a V-belt T, the section 13 being fast with the drive-shaft 10 and the opposite section 12 being adjustable with respect to the fixed section to alter the effective diameter of the pulley. The adjustable half 12 of the pulley 11 has its hub screw-threaded to a sleeve 14 keyed to the shaft at 15. A nut 16 screwed onto the reduced end of the shaft 10 is set up against the end of the sleeve 14 to hold its opposite end in abutting relation to a bearing 20 for the shaft. A nut 18 threaded onto the sleeve 14 is set up against the end of the hub of the pulley section 12 to lock it in its adjusted position on the sleeve.

Main drive of machine

The drive-shaft 10 is journaled in ball-bearings 20 and 21, the bearing 20 being mounted in an opening 22 at the end of the bottom casing section 3 by means of a flanged disk 23 fitting the opening and fastened in place by screws 24. The opposite ball-bearing 21 is held in an upright or stanchion 25 (Fig. 3) rising from the bottom of the base 3 and formed integral therewith. A thrust-collar 26 screwed onto an enlarged section 27 of the drive-shaft 10 abuts an oil-seal washer 28 engaging the side of the ball-bearing 20 to take the axial thrust in one direction, while the sleeve 14 which carries the pulley halves 12 and 13 abuts the opposite side of the bearing as previously explained.

A worm 30 is fast on the shaft 10 abutting the end of the collar 26 and constitutes the drive to certain parts of the mechanism to be described hereinafter. Fast on the right-hand end of the drive-shaft 10 is a female clutch-member 35 having its hub secured to the shaft by suitable means such as set-screws 36. Mounted within the interior of the flanged portion of the clutch-member 35 is a ball-bearing 37 which serves as the journal for a bearing member 38 on the end of a shaft 40 constituted as the winding spindle of the machine. The winding spindle 40 thus forms an axial extension of the drive-shaft 10 and serves as the means for rotating the winding bobbin and also driving a helical cam 44 on the spindle. The cam 44 is driven by a gear 42 and a gear-train, later described, for reciprocating the traverse-mechanism of the machine.

Drive-clutch mechanism

Engageable with the female clutch-member 35 is a male clutch-member 45 mounted on the spindle 40 with its hub keyed thereto at 46 and secured longitudinally by a set-screw 47. A helical spring 48 has one end mounted on a reduced portion of the bearing member 38 and its opposite end held by a shouldered portion of the hub of the clutch-member 45, thus normally tending to slide the member 45 to disengage its clutch-face from that on the female clutch-member 35. The cam 44 has fast in its bore a pair of sleeves 49 and 50 free to turn on an enlarged portion of the spindle 40. The sleeve 49 carries a helical gear 51 fast therewith for rotating the traverse-cam 44 from the gear-train, previously mentioned.

Figure 19:
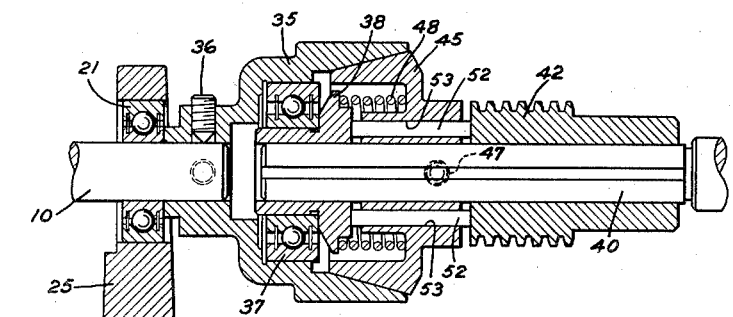
Fig. 19 is a longitudinal sectional view of the clutch for driving the winding spindle and traverse-cam showing the spacing means for the male clutch-member.

Referring to Fig. 19, a pair of pins 52 held in longitudinal bores 53 of the clutch-member 45 are arranged with their ends engaging the end of the bearing member 38 and the gear 42 to take the thrust between these two elements and maintain them in spaced relationship while permitting the spindle 40 to slide longitudinally therein for the purpose later explained. Fastened to one end of the hub of the cam 44 is a cam-disk 55 secured rotatively therewith by one or more screws 56 while the opposite end of the cam is formed with an eccentric bearing hub 59 on which an annulus 60 is mounted to adapt it to be oscillated for a purpose later explained.

Bobbin-drive

The end of the sleeve 50 is received in a plain bearing 61 formed in the hub of a member 62 which has its flanged rim fitted within a shouldered opening 63 in the end wall of the casing 3 and secured by screws 64. The member 62 serves as a bearing for supporting the end of the spindle 40 while permitting the latter to slide longitudinally therein. It should be explained that the spindle 40 is slidable longitudinally to engage the clutch-members 35 and 45 when the bobbin B is placed in engagement with the end of the spindle as indicated in Fig. 5. Fastened to the end of the spindle 40 is a concaved disk or member 65 having a tapered cavity or recess for receiving the enlarged end or butt $b$ of the bobbin B. The member 65 has a stem 66 screwed into a threaded bore in the end of the spindle 40 for securing it in place. It will be understood that when the bobbin B is applied to driving position and forced into the cavity of the member 65, which constitutes a driver-chuck for rotating the bobbin, the spindle 40 will be slid axially to compress the spring 48 and engage the clutch-member 45 with the member 35 to provide a driving connection between the drive-shaft 10 and the spindle. The bobbin B is donned in winding position between the end of the spindle 40 and outboard bearing constituted by a center or chuck 67 (Fig. 6) which is journaled on a dead spindle 68 slidable in a bearing on a tail-stock bracket 70 mounted in the outboard bracket 5 which overhangs the side of the casing 3. The means for sliding the spindle 68 and its rotary chuck 67 is described hereinafter in connection with the donning and doffing mechanism of the machine.

Traverse-cam drive

Referring to Figs. 3, 5, 20 and 22, the traverse-cam 44 is driven from the spindle 40 when the latter is clutched to the drive-shaft 10 in the manner as previously explained. The train of gearing for the cam-drive comprises the worm 42 (Fig. 5) keyed to the spindle 40 and meshing with a worm-gear 74 fast on a shaft 75 that also carries a spur-gear 76 at its opposite end. The shaft 75 is journaled in bearings on a bracket 77 (Fig. 22) having its base secured by a bolt 78 to a pad 79 on the bottom of the casing section 3 and held by dowel-pins 80. The bracket 77 extends upwardly in a triangular portion 81 having an offset boss 82 secured by a bolt 83 to an auxiliary bracket 84 fastened to a portion of the casing section 3, this last-mentioned bracket 84 being described more in detail later as providing bearings for certain rotating parts of the machine.

Figure 20:
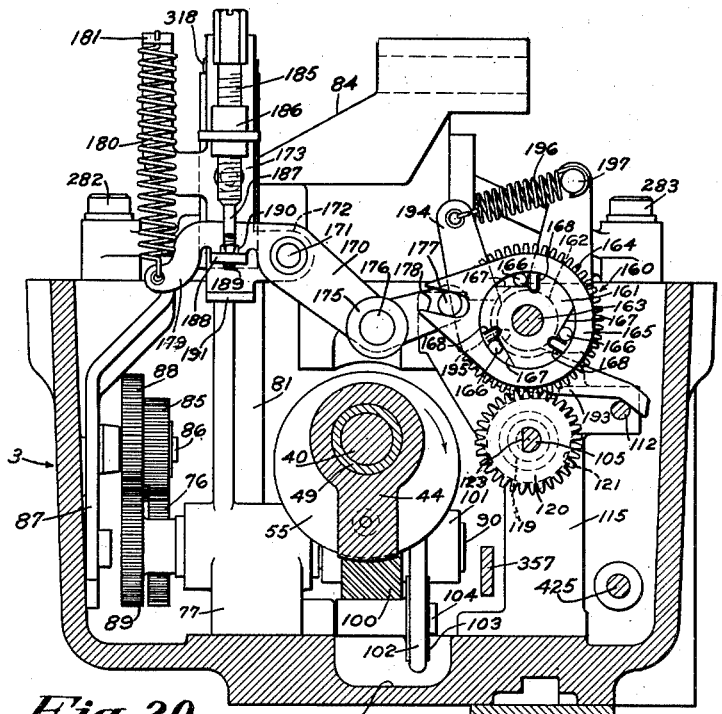
Fig. 20 is a transverse sectional view through the lower part of the casing showing the one-way clutch-mechanism for rotating the traverse-rod to intermittently feed the yarn-guide outwardly along the bobbin.

The gear 76 meshes with a similar gear 85 (Fig. 3) free on a shaft 86 projecting from an adjustable arm or bracket 87. Referring to Fig. 20, the gear 85 has fast therewith a larger gear 88 meshing with a gear 89 on a shaft 90 journaled in bearings in the stationary bracket 77 and extending parallel to the shaft 75. The two gears 85 and 88 preferably are change gears for regulating the speed of the drive between the spindle 40 and the traverse-cam 44. The adjustable arm 87 permits substitution of different gears on the shaft 86 between the gears 76 and 89 on the shafts 75 and 90. The adjustable bracket 87 is in the form of a paddle-shaped plate having a pair of slots 96 for reception of bolts 97 and 98 screwed into the side of the casing section 3 to fasten the bracket in adjusted position with the gears in mesh. The shaft 90 carrying the gear 89 has a helical gear 100 fast on its opposite end in mesh with the helical gear 51 on the sleeve 49 which is fast in the axial bore of the traverse-cam 44. The traverse-cam 44 may thus be driven from the spindle 40 through the gear-train last described with a considerable reduction in its speed.

Figure 22:
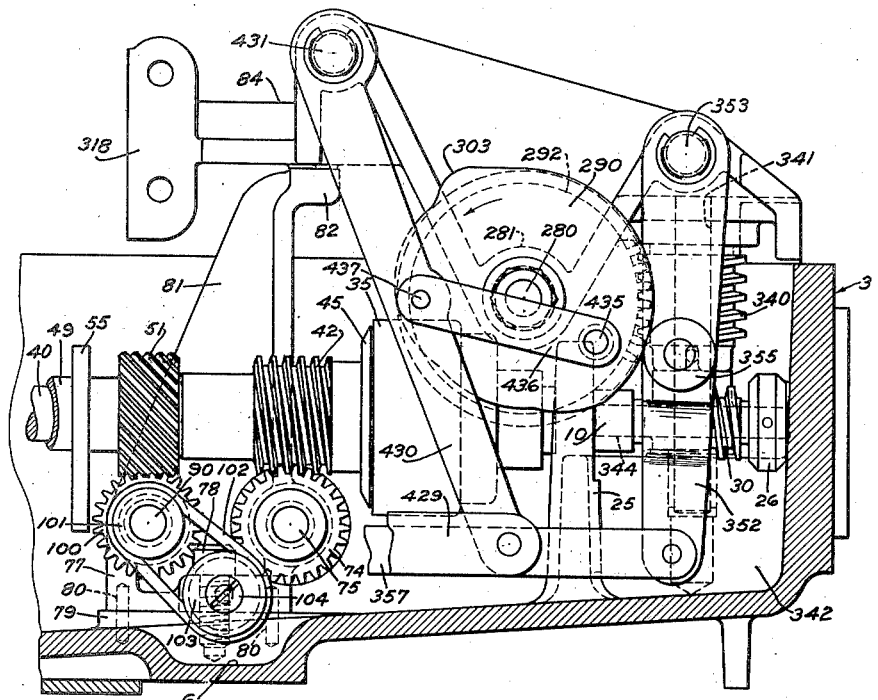
Fig. 22 is a longitudinal part-sectional view through the casing showing a portion of the gearing between the winding spindle and traverse-cam and also illustrating the cycling-cams and the levers oscillated thereby.
Figure 23:
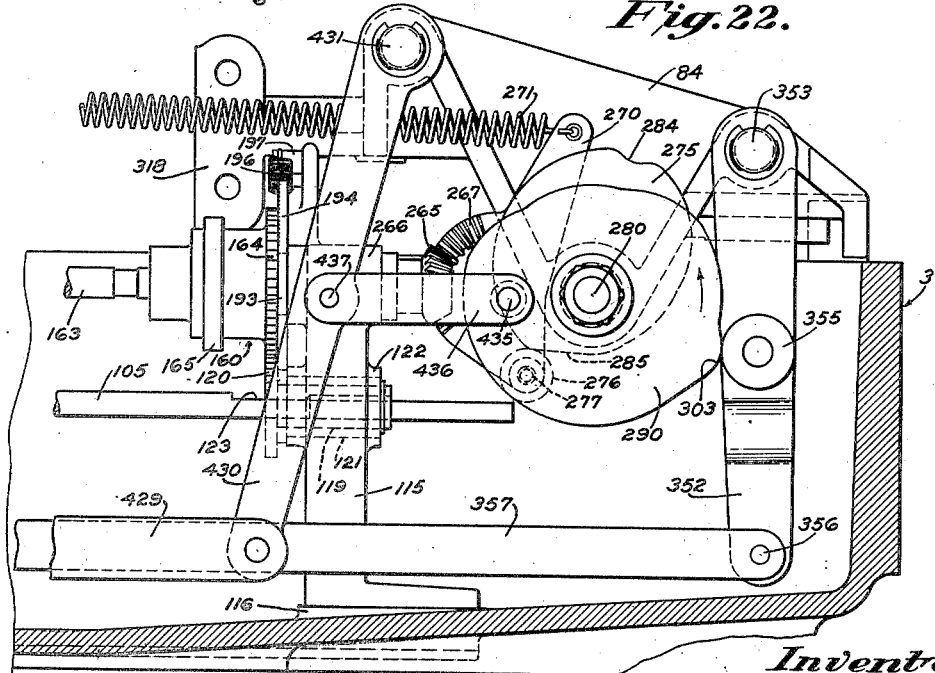
Fig. 23 is a similar view showing the cams in a different relationship.
Figure 24:
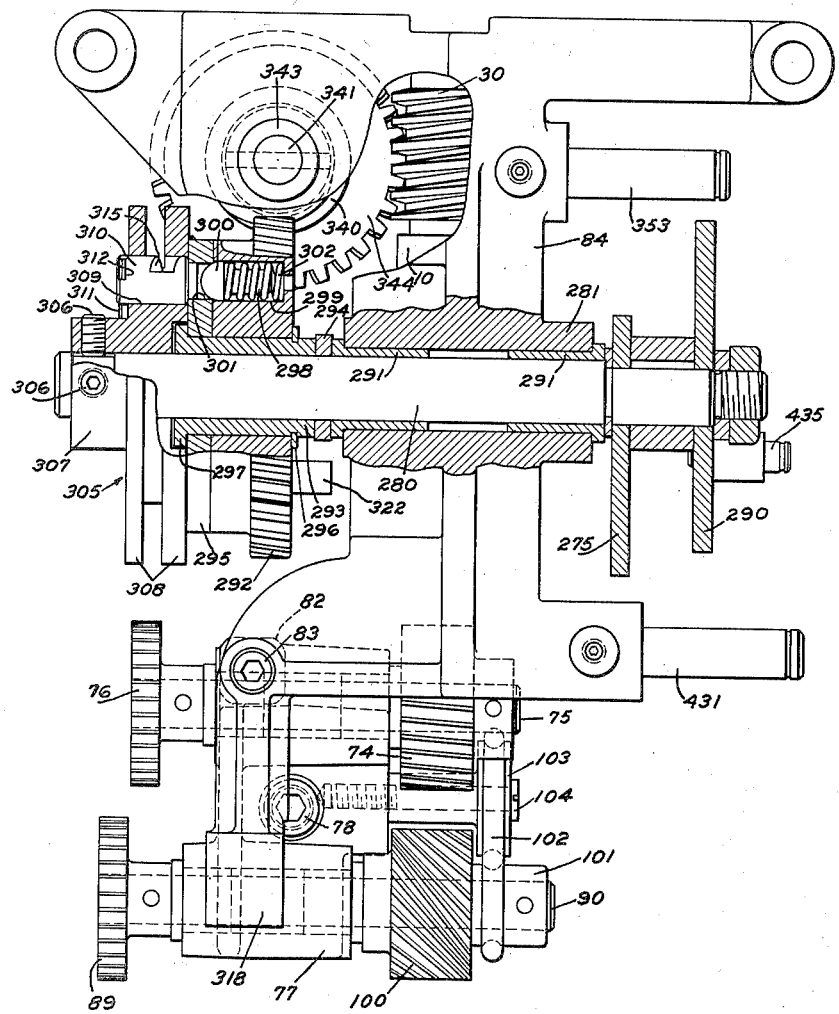
Fig. 24 is an enlarged part-sectional plan view of the gearing between the drive-shaft and cycling-cam shaft and showing the clutch for connecting the driving gear to said cam-shaft.

Referring to Figs. 22 and 24, means are provided for lubricating the gear-train, last described, comprising a pulley 101 on the shaft 90 connected by a belt 102 to a similar pulley 103 that is journaled on a stud 104 held in the base of the bracket 77, previously mentioned. The belt 102 dips into the oil in the sump 6 to carry it up for lubricating the gearing as the pulley 101 is turned with the gear 100.

Yarn-traversing mechanism

Figure 2:
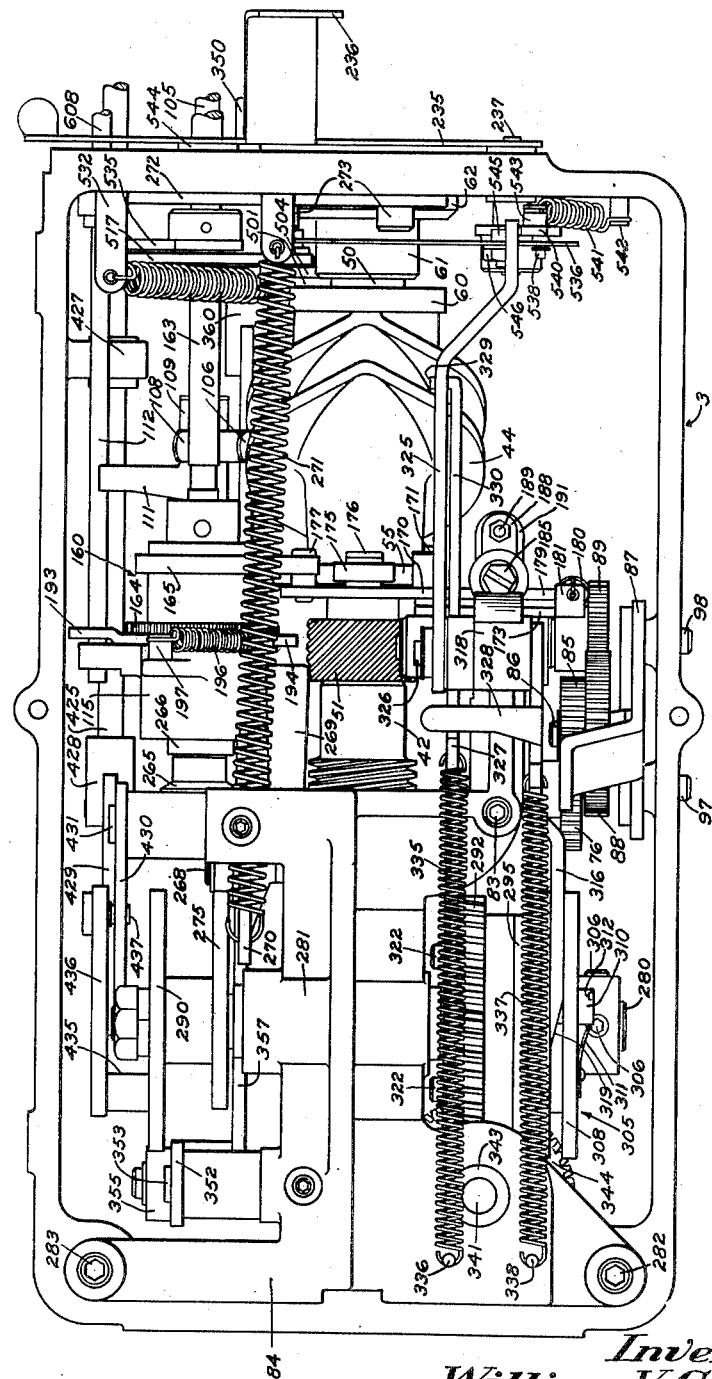
Fig. 2 is a plan view of the casing with the cover removed and showing the driving means for the winding elements and also portions of the cycling mechanism.

Referring to Figs. 2 and 4, the traverse-rod 105 which carries the yarn-guide, later described, at its outer end is reciprocated from the traverse-cam 44 on the spindle 40 by means of a roller 106 journaled on a stud 107 and engaging the helical groove in the cam. The stud 107 is mounted fast in a hub or boss 108 on a sleeve 109 surrounding the traverse-rod 105. The sleeve 109 is secured longitudinally of the rod 105 by means of spring-rings 110, shown in Fig. 4, sprung into shallow grooves in the rod at either end of the sleeve. An arm 111 extends laterally from the sleeve 109 with its outer end bifurcated to straddle a smaller rod 112 held parallel with the traverse-rod 105. The inner end of the parallel rod 112 is fixedly mounted in a bracket 115 with its outer end held in the end wall of the casing section 3 (Fig. 4). The arm 111 is adapted to slide on the rod 112 and hold the sleeve 109 from turning on the traverse-rod 105 while permitting the rod to rotate within the sleeve.

Figure 21:
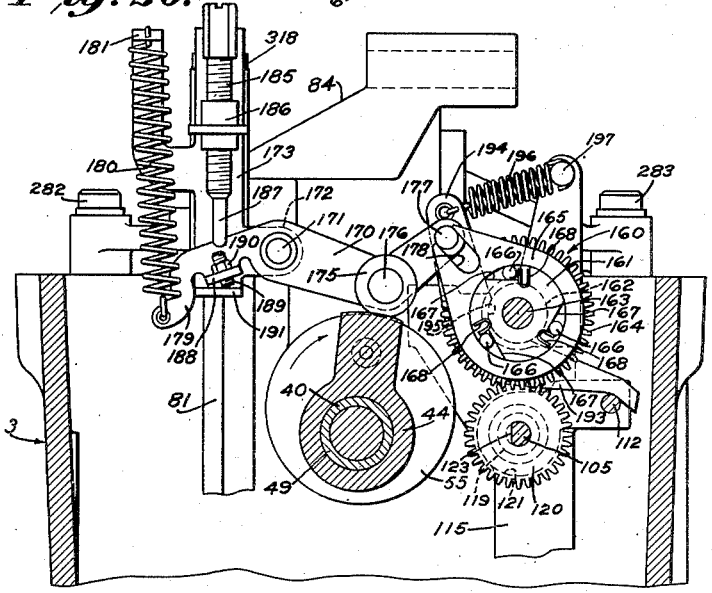
Fig. 21 is a similar view showing the parts in a different relationship.

The bracket 115 has its base supported on a pad 116 on the bottom wall of the casing section 3, being secured thereto by a bolt 117 and held from turning by dowel-pins 118, this mounting for the bracket being similar to that for the bracket 77, previously mentioned. The inner end of the traverse-rod 105 is mounted to slide in the bore of a sleeve 119 which forms the journal for a gear 120 employed for rotating the traverse-rod for a purpose later explained. The sleeve 119 is journaled in a bushing 121 held in the bore of a hub-like bearing 122 on the bracket 115. This end of the traverse-rod 105 is flatted at 123 along a portion of its length for engaging a flatted portion of the bore in the sleeve 119 carrying the gear 120. In this way the gear 120 is keyed to rotate the traverse-rod 105 for feeding the yarn-guide 125 axially along the barrel of the bobbin being wound to build it with a weft or filling wind in a manner well known to those versed in the winding art. The traverse-rod 105 is slidable in a bushing 126 in the end wall of the casing section 3 and reaches out there-beyond with its terminal portion slidably supported in a bushing 127 in a plate 128 in the tail-stock bearing 70 (Fig. 7). A clutch of ratchet-type is provided for rotating the traverse-rod 105 to feed it longitudinally for advancing the yarn-guide 125 during the building of the bobbin, such means being shown in Figs. 20 and 21 and later described.

Yarn-guide advancing means

The outer overhanging portion of the traverse-rod 105 is formed with relatively fine threads 124 for feeding the yarn-guide 125 therealong (Fig. 8), in building the bobbin with overlapping longitudinally-advanced conical chases as is the usual method of winding weft or filling for use in the shuttles of looms. The yarn-guide 125 is not mounted directly on the traverse-rod 105 but is carried by a slidable member 130 which is bored to receive a rod 131 for slidingly mounting it thereon. The rod 131 is held at its outer end in a bore in a plate 128 fastened to the face of the tail-stock bracket 70 while its inner end passes through a bore in the end wall of the casing section 3 and provides a mounting for another element later described. Suitable means such as spring-rings 132 abutting the sides of the end wall of the casing section 3 engage grooves in the rod 131 to hold it from longitudinal displacement (Fig. 8). The slidable member 130 is bifurcated at its upper portion to provide a pair of spaced bearings 133 for mounting a pin 135 on which the yarn-guide 125 is pivoted to adapt it to be swung upwardly for releasing it from the traverse-rod 105 in the manner and for the purpose as later explained. The slidable member 130 has a downwardly and laterally-extending leg 136 (Fig. 32) provided with a shoe 137 at its end which is slidable in a trackway formed by the folded over end 138 of a plate 139 fastened to the top of the outboard bracket 5, previously described. The shoe 137 thus prevents the bearing element 130 from turning on the rod 131 during its sliding motion therealong. The yarn-guide 125 comprises a yoke-shaped bearing member 145 from which extends a sheet-metal arm 146 carrying a guide-eye 150 at its outer end through which the yarn-strand leads to distribute it on the winding bobbin during the traverse of the guide. A helical spring 151 coiled about the pivot-pin 135 has one end held fast at 152 and its opposite end engaging the forked yoke 145, thereby tending normally to rock the arm 146 downwardly.

Extending parallel with the arm 146 therebeneath is a shorter arm 155 (Figs. 34, 36) which is formed with screw-threads 156 on its under side engageable with the threads 124 on the traverse-rod 105. The spring 151 will thus normally maintain the threaded portion 156 in engagement with the threads on the traverse-rod 105 while permitting the guide 125 to be swung upward to release its connection with the rod for returning the yarn-guide to initial winding position after the completion of a bobbin.

Means for rotating traverse-rod

Referring to Figs. 4 and 20, the traverse-rod 105 is rotated to turn its threaded portion for advancing the yarn-guide 125 by means of the gear 120, previously described as having the bore in its integral sleeve 119 formed with a flat portion for engaging the flatted side 123 of the traverse-rod 105. As before noted, the traverse-rod 105 is rotated intermittently in somewhat the manner of a ratchet-drive which preferably includes a one-way clutch 160 of conventional design. The clutch 160 has a hub-portion 161 integral with a sleeve 162 mounted to rotate on a shaft 163 and formed as a part of or fastened to a spur-gear 164 which meshes with the gear 120 for rotating the rod 105. The shaft 163 is mounted at one end in a bearing in the upright bracket 115, previously described, and extends through a bushing in the end wall of the casing section 3 with its outer end supported in a bushing in the plate 128 fastened to the tail-stock bracket 70, this outer portion of the shaft 163 being employed for mounting a part of the bobbin-donning mechanism as later explained.

For the present purpose it will be sufficient to explain that the clutch 160 comprises an outer freely rotatable annulus 165 carrying rollers 166 adapted to engage with and ride up the inclined faces 167 on the hub-portion 161 of the clutch to lock the annulus for turning the hub and thereby the gear 164 which drives the gear 120 on the traverse-rod 105. A plurality of U-shaped springs 168 within the confines of the clutch-annulus 165 serve as retainers for the rollers 166 to hold them in position to ride on the inclined faces 167 as previously explained.

Clutch actuating means

The outer clutch-member or annulus 165 is oscillated to cause it to engage with the hub 161 and intermittently rotate the latter by a crank-motion actuated by the eccentric-disk 55 on the hub of the traverse-cam 44. For this purpose a bell-crank lever 170 is pivoted on a stud 171 projecting from an ear 172 on a plate-member 173 fastened to the bracket 84, previously mentioned. The bell-crank 170 carries a roller 175 journaled on a stud 176 at the elbow of the bell-crank. A pin 177 at the outer angular end of the main arm of the bell-crank lever 170 engages in a slot 178 formed by a bifurcated portion of the clutch-annulus 165, the roller 175 being engageable by the periphery of the eccentric disk 55 on the cam 44 to rock the bell-crank lever and oscillate the clutch-annulus. The shorter arm 179 of the bell-crank lever 170 has attached thereto a helical spring 180 anchored at its upper end to an arm 181 rising from the sheet-metal plate 173 on the front of the bracket 84. The spring 180 tends to rock the bell-crank lever 170 to position its roller 175 for engagement with the periphery of the eccentric disk 55, the roller being limited in the amount of its contact with the disk by adjustable means which regulate the timing and extent of the oscillating motion of the clutch-annulus so as to control the amount of rotation imparted to the traverse-rod 105. For this purpose a set-screw 185 threaded through a bearing 186 on the plate 173 has a reduced extension 187 adapted to engage against a forwardly-projecting ear 188 on the arm 179 of the lever 170. A screw 189 threaded through the ear 188 with a nut 190 for locking it in adjusted position serves as a stop for engaging an ear 191 on the plate 173 to limit the rocking motion of the lever 170 against the tension of the spring 180. The adjusting screw 185 may be turned to regulate the position of the end of its reduced portion 187 so that a very fine adjustment can be secured to control the rocking motion of the bell-crank lever 170 and thereby the relationship of its roller 175 to the periphery of the cam-disk 55. In this way the motion of the clutch-annulus 165 in counter-clockwise direction as viewed in Fig. 21 can be adjusted very accurately to regulate the amount of rotation of the traverse-rod 105 and thereby the extent of feed of the yarn-guide 125 during each of its strokes. The yarn-guide 125 is fed forwardly with a slight increment of motion at each stroke whereby to advance the zone of traverse of the guide and thereby build the bobbin by longitudinal extension as common in weft or filling winders.

Referring to Figs. 4 and 20, a brake 193 consisting of an angular sheet-metal member has its lower end supported on the stationary rod 112 with its arm 194 reaching upwardly and formed with a concavity 195 in its edge engaging the periphery of the sleeve 162 integral with the hub 161 of the clutch 160. A spring 196 connected to the end of the arm 194 is anchored at its opposite end to a pin 197 in an extension of the bracket 115. The brake 193 is thus maintained in frictional contact with the sleeve 162 of the hub 161 of the clutch to prevent its unwarranted rotation.

Bobbin-donning means

As previously stated, the donning means for supplying empty bobbins to the winding spindle and the doffing means for removing completed bobbins therefrom are arranged on the outside of the casing 2, being supported by the bracket 5, previously mentioned. The bracket 5 is of substantially hollow construction in the form of a pair of parallel horizontal rails 200 and 201 connected by end members 202, 203 and cross-members 204 and 205 as shown in Fig. 7. The member 203 at the inner end of the bracket 5 is bolted to the end wall of the casing section 3 at 206. The outer end of the bracket 5 is formed with a box-like housing 209 for containing certain parts of the operating mechanism for the donning and doffing means and it also provides a support for the outboard tailstock bracket 70, previously mentioned.

Bobbin supply hopper

As in our prior application, a supply of empty bobbins B is held in a hopper indicated generally by the reference numeral 210 in Figs. 6 and 7, and constituted as a superstructure surmounting the bracket 5. The hopper 210 comprises an inclined U-shaped trough-portion 211 (Fig. 16) supported at one end by a bracket 212 having its foot bolted to the top of the tail-stock bracket 70 at 213. The inner end of the trough 211 is joined to a sheet-metal plate 215 (Fig. 6) fastened to the end of the cover section 4 of the casing 2 by screws 216 projecting through bosses on the rear of the plate which abut the end of the casing. The trough-portion 211 (Figs. 14–16) has its sides 217 projecting upwardly from a bottom wall 218 which is formed with a slot or opening 219 dimensioned to permit the barrel of the bobbin B to drop therethrough and at its inner end the bottom is completely cut away to provide an opening large enough for the head of the bobbin to fall through. Beneath the larger opening in the trough the end plate 215 is formed with a portion of the metal sheared from an opening therein and folded forwardly to provide an inclined rest or shelf 220 for receiving the head end of the bobbin B as it drops from the trough 211. Spaced forwardly from the shelf 220 is a chute 221 (Fig. 7) for receiving the tip end of the bobbin delivering from the hopper. The chute 221 is constructed of sheet-metal folded to provide opposite sides formed with outwardly offset extensions 222 at the top which are fastened to the sides of the trough 211 by bolts 223. Preferably, a series of bolt holes 225 are provided along each side of the trough 211 so that the chute 221 may be adjusted in spaced relationship to the end plate 215 for bobbins of different lengths.

At the lower end of the chute 221 the metal is bifurcated and bent forwardly to provide an inclined rest 230 for supporting the tip end of the bobbin when it drops from the trough 211 into position to be carried down for donning it in connection with the winding spindle 40. Below the inclined upper shelf or rest 220 is a secondary rest 231 having its rearward portion inclined upwardly towards a back-stop 233 formed by a vertical portion of the end plate. These last-named parts of the hopper are arranged so that as the head of the bobbin B drops onto the upper inclined shelf 220 it will roll rearwardly to drop off from its end onto the inclined rearward portion of the lower shelf 231, and finally drop down into the position shown in Fig. 6 where it brings up against a vertical stop plate 234 which is formed by a folded portion of the end plate 215. At this juncture the tip end of the bobbin will rest on the shelf 230 at the lower end of the chute 221 and the head end of the bobbin will make contact with a lever 235, the larger end of the barrel of the bobbin being received on the arcuate edge of a rest 236 folded upwardly from a lateral arm on the sheet-metal lever 235.

The hub of the lever 235 is fast on a pivot-pin 237 that is journaled in a bore in the end wall of the casing section 3 and connected therewithin to detent-means for controlling the operation of the bobbin-donning and -doffing means. As will be explained later, the lever 235 serves as a trip, being normally positioned with its outer end inclined upwardly as shown in Fig. 14 and maintained in this position by engaging against a stop pin 238 projecting from the side of the casing section 2. Briefly, the lever 235 acts as a detention control for the donning and doffing means, it being necessary that a bobbin be in donning position as shown in Fig. 15 to force the lever downwardly and release the detent-means which holds the donning mechanism inoperative; this part of the invention being described more fully hereinafter.

Figure 1:
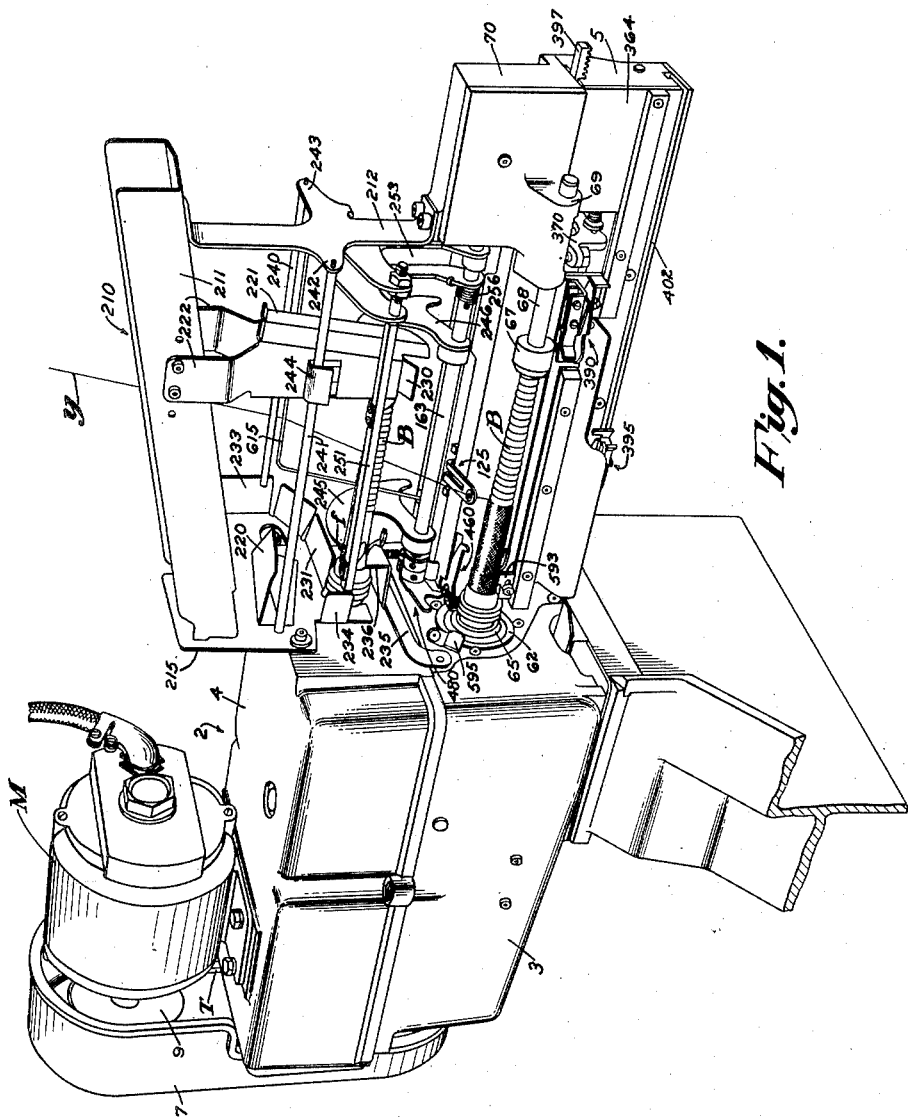
Fig. 1 is a general perspective view of the complete machine showing the casing containing the driving means and automatic cycling mechanism combined with the winding unit and outboard donning and doffing mechanism embodying strand-controlling devices.

The superstructure for supporting the hopper 210 includes a pair of parallel rods 240 and 241 of relatively small diameter having their forward ends supported in holes at the ends of arms 242 and 243, see Figs. 1 and 16, on the upright bracket 212. The rearward rod 240 has its opposite end slotted to receive the end of the back-stop plate 233 with a projection engaging through an opening therein for holding the rod in place. The front rod 241 has its rearward end reduced in diameter and inserted through a hole in the end plate 215. This rod forms a part of the support for the chute 221 by engaging through the loop of a strip 244 sheared from the metal of the chute.

Means for transperring bobbin from hopper

As in the machine of our prior application, the empty bobbin B is donned by carrying it off from its rests, above described, and swinging it downwardly into alinement with the axis of the winding spindle 40 with its head adjacent the driver-chuck 65 and its tip end opposite the chuck 67 on the spindle 68 in the tail-stock bracket 70. The instrumentalities for performing this function of transferring the bobbin from the hopper to winding position comprises a pair of quadrant-shaped arms 245 and 246 mounted for rotative movement on the shaft 163, previously mentioned. The two arms 245 and 246 have hubs 247 secured fast on the shaft 163 by set-screws or other means (Fig. 6). The forward ends of the arms 245 and 246 are notched at 248 (Fig. 15) to adapt them to engage firmly with the barrel of the bobbin being transferred for donning it in winding position. Prior to the bobbin being carried down for donning it is held from forward movement by a pair of spring-fingers 249 and 250 (Fig. 6) constructed of relatively thin resilient metal and mounted in spaced apart relationship on a square rod 251. The fingers 249 and 250 are folded over the top of the rod 251 and fastened by screws 252. The rod 251 is carried by a two-sided or bifurcated arm 253 mounted on the shaft 163 on which the arms 245 and 246 are carried. The two-sided arm is formed by a strip of sheet-metal folded into trough shape, a hub 254 being attached between the sides of the arm and mounted free to turn on the shaft 163. The rod 251 projects through holes in the sides of the arm 253 and is screw-threaded at its end to receive a pair of nuts 255 which secure it to one side of the arm. A helical spring 256 coiled around the shaft 163 with one end held by a pin 257 has its opposite end engaging around one side of the arm 253 and 258 to normally swing the arm in clockwise direction as viewed from the right in Fig. 1. A finger 260 projecting from the bracket 212 is adapted to engage one side of the arm 253 to limit its swinging movement under the tension of the spring 256.

Drive for bobbin-transfer means

Referring to Fig. 4, the shaft 163 is rotated through approximately ninety degrees to rock the quadrant-arms 245 and 246 for carrying the bobbins B down into donning relationship by means of a bevel-gear 265. The gear 265 is fast on the inner end of the shaft 163 which projects through a bearing 266 on the bracket 115. The gear 265 meshes with the teeth of a quadrant 267 rotatably supported by a stub-shaft 268 fast in an arm 269 projecting rearwardly from the bracket 115. The quadrant 267 is formed with an upstanding arm 270, to the end of which is connected a helical spring 271 anchored at its opposite end to an upright member 272 fastened to the forward wall of the casing section 3 at 273. The spring 271 tends to rock the quadrant 267 in clockwise direction to cause its teeth to turn the gear 265 for rotating the shaft 163 to swing the quadrant arms 245 and 246 in counter-clockwise direction as viewed in Fig. 15. For rotating the shaft 163 in the opposite direction to swing the arms 245 and 246 upwardly the quadrant 267 is rocked in the opposite direction against the tension of the spring 271 by means of a cam 275 engaging a roller 276 journaled on a pin 277 fast in the lower triangular extension of the quadrant.

The cam 275 is fast on a cross-shaft 280 journaled in a bearing 281 formed integral with the bracket 84, previously described. The bracket 84 is supported from the end wall of the casing section 3 by screws 282 and 283 (Figs. 3 and 20) screwed into bosses on the wall; the bracket 84 also being connected to the upright bracket 77 by the stud 83, previously mentioned, to reinforce the structure. The cam 275 is of substantially egg shape in outline, its periphery having a relatively long eccentric portion interrupted by a depression 284 and a relatively flat length 285. The cam-shaft 280 is driven in clockwise direction, as viewed in Fig. 4 to oscillate the quadrant 267 in counter-clockwise direction for turning the gear 265 and shaft 163 in swinging the quadrant-arms 245 and 246 and the arm 253 rearwardly and upwardly as viewed in Figs. 1 and 15 in donning the empty bobbin B. The quadrant 267 is returned in the opposite direction under the tension of the spring 271 to lower the arms 245, 246 and 253 in the manner as more fully explained hereinafter.

Cycling-cam shaft

The shaft 280 is constituted as the cycling-cam shaft for actuating the donning- and doffing-mechanism by means of the cam 275 and also carries a combined cam and crank-disk 290 fast thereon for operating other means later described. The cam-shaft 280 is rotated by clutch-means connecting it to the drive-shaft of the machine, it being noted here that the shaft makes a single rotation for functioning in the manner indicated; the control-means for initiating rotation of the cam-shaft being brought into action by the means actuated by the yarn-guide 125 when it reaches the end of its advance to complete the winding of a bobbin. The cam-shaft 280 is journaled in bushings 291 at the ends of the bearing 281 (Fig. 24) and has normally rotatable thereon a worm gear 292 from which it is driven through the means of the clutch, previously mentioned. The gear 292 is mounted on a sleeve 293 journaled on the shaft 280 with a rotatable spacing-collar 294 between the end of the sleeve and the end of the bushing 291. The gear 292 is connected to a clutch-disk 295 by yieldable means later described. A spring-ring 296 in a groove adjacent the end of the sleeve 293 engages the gear 292 to retain it with the clutch-disk 295 abutting a shoulder 297 on the opposite end of the sleeve 293.

Yieldable connection of clutch to gear

A plurality of plunger-pins 298, preferably four in number, slidably mounted in bores 299 in the thicker portion of the gear 292 and formed with semi-spherical heads 300 are adapted to engage in a plurality of holes 301 in the clutch-disk 295. Springs 302 pocketed in the bores 299 urge the spherical heads of the plunger-pins 298 into engagement with the holes 301 for releasably clutching the disk to the gear 292 while permitting disconnection between these elements under an overload on the gear should the parts of the mechanism be dislocated by accident to cause binding and resistance to rotation of the shaft 280. Normally the gear 292 and its clutch-disk 295 rotate as a unit with the sleeve 293 on the shaft 280, but are connected to drive the shaft by means of a clutch-member 305 secured fast to the shaft 280 by set-screws 306 in its hub 307.

Cycling-cam shaft driving clutch

The clutch-member 305 is grooved to provide a pair of spaced flanges 308 (Fig. 24) bored laterally at 309 to receive a slidable clutch-pin 310 having a reduced extremity adapted to engage in any one of the holes 301, previously mentioned, in the clutch-disk 295. The pin 310 is slidable under the tension of a flat leaf-spring 311 fastened to the side of the flange 308 on the clutch-member 305 with its end bearing against the end of the pin. This end of the spring 311 engages in a transverse slot 312 in the end of the pin 310 to prevent the latter from turning in the bore 309. The larger portion of the pin 310 is formed with a helical slot 315 cut through its periphery and adapted to be engaged by the tapered end of a lever 316 (Fig. 30) for withdrawing the pin from engagement with the hole 301 in the disk 295, whereby to release the drive between the clutch-member 305 and the gear 292. The lever 316 is pivoted on a pin 317 held in an extension 318 of the bracket 84. Referring to Fig. 3, the forward end of the lever 316 is chamfered at 319 to provide a tapering wedge for insertion through the slot 315 in the clutch-pin 310 to withdraw the latter from engagement with the clutch-disk 295 carried by the gear 292. For clarity of description it should be noted that the lever 316 when viewed from the side is substantially in alinement with another lever 320 extending in the same direction and having its free end arched at 321 with its under edge inclined and terminating in a rounded point, see dotted lines Figs. 3 and 30. This end of the lever 320 is adapted to be engaged by one or the other of two pins 322 projecting from the side of the gear 292 whereby to lift the lever during the rotation of the gear. The lever 320 is pivoted on a pin 323 projecting from the rearward side of the downwardly-extending arm 324 of a lever 325 that is pivoted on a pin 326 in the extension 318 of the bracket 84. The lever 320 has an upstanding arm 327 which extends across and is adapted to engage a laterally-extended finger 328 (Fig. 2) on the lever 316. The lever 320 also has a right-angular finger 329 at the end of its arm 330 which is engageable under the end of the lever 325. The levers 320 and 325 are thus arranged for cooperation to control the action of the lever 316. A helical spring 335 connected to the end of the upstanding arm 327 on the lever 320 is anchored at its opposite end to a pin 336 (Fig. 2) in the bracket 84 and normally tends to rock this lever counterclockwise as viewed in Fig. 30. A similar spring 337 connected to an upstanding finger 331 on the lever 316 is anchored to a pin 338 in the bracket 84, thus normally tending to rock this lever downwardly or in counterclockwise direction as viewed in Fig. 30. The curved end of the lever 320 rides on the rotating collar 294 (Fig. 24) on the shaft 280 when the lever is released from either pin 322 on the gear 292.

Drive for cam-shaft gear

The gear 292 is driven continuously from the main drive-shaft 10 of the machine, its teeth meshing with a worm 340 (Fig. 24) on a vertical shaft 341 stepped in the bore of a bearing 342 formed as a part of the casing section 3 (Fig. 3) with its upper end journaled in a bushing 343 in an overhanging plate-portion on the bracket 84.

A worm-gear 344 on the vertical shaft 341 meshes with the worm 30, previously mentioned, on the drive-shaft 10 (Fig. 5). It will thus be understood that the continuously rotated drive-shaft 10 drives through the worm 30 and worm-gear 344 to rotate the shaft 341 and through the worm 340 drives the worm-gear 292 to normally rotate it on the cam-shaft 280. When, however, the pin 310 on the clutch-member 305 is engaged with a hole in the clutch-disk 295 the gear 292 will rotate the shaft 280 through one revolution in the manner and for the purpose later explained.

Bobbin-doffing means

It is obvious that the wound bobbin must be doffed from the winding spindle before a new bare bobbin can be donned in driving connection therewith. Referring to Figs. 4, 6, 17 and 18, release of the wound bobbin B is effected through withdrawal of the outboard bearing-chuck 67 from the tip end of the bobbin by sliding the spindle 68 through the tail-stock bearing 69. For this purpose a horizontal rod 350 is slidably mounted in a bushing 351 held in a bore in the end wall of the lower casing section 3 and operated from the cam 290 on the shaft 280 by means of a rockable lever 352 pivoted on a pin 353 in the bracket 84. The lever 352 mounts a rotatable bowl or roller 355 engageable with the periphery of the cam 290 for oscillation thereby. The lower end of the lever 352 is pivotally connected at 356 to the end of a relatively long link 357. The opposite end of the link 357 is pivotally connected at 358 to a coupling 360 screwed onto the threaded end of the rod 350. Through this threaded connection the operative length of the rod 350 may be adjusted as required to slide the spindle 68 for withdrawing the chuck 67 from the tip end of the wound bobbin.

Figure 17:
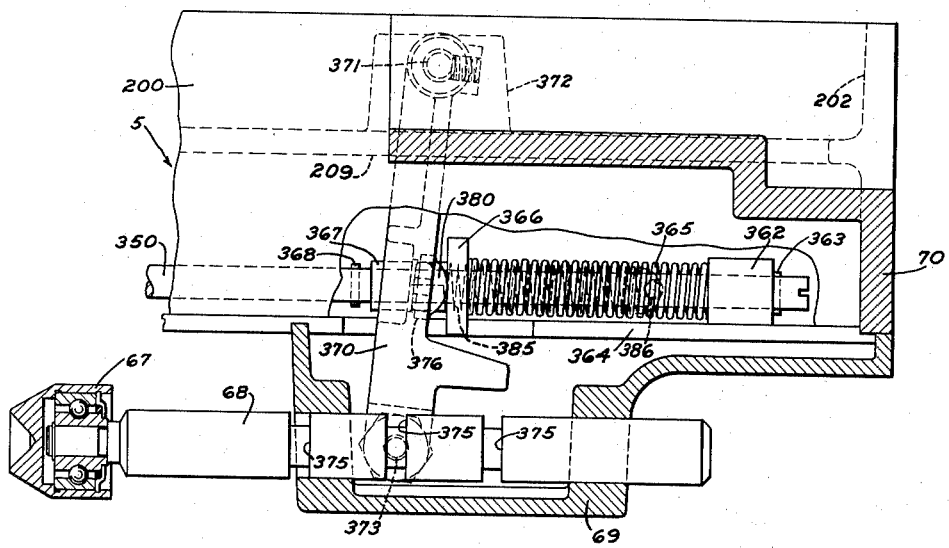
Fig. 17 is a part-sectional plan view of the tail-stock bearing showing the slidable dead-spindle with its chuck for rotatably supporting the tip end of the bobbin and illustrating a portion of the means for sliding said spindle.

Referring to Fig. 17 which is a plan view, part-sectional through the tail-stock bearing 69, the outermost end of the rod 350 carries a block 362 held from movement longitudinally thereof by a pin 363 projecting through the rod at the end of the block. The forward side of the block 362 bears against a front cover-plate 364 on the bracket 5 and is slidable thereon. A helical spring 365 surrounding the rod 350 bears against the block 362 at one end with its opposite end engaging against a flange 366 on the end of a sleeve 367 which encloses the rod. A pin 368 in the rod 350 is adapted to engage the end of the sleeve 367. The rod is moved in the first instance to only a slight extent for releasing the pressure of the chuck 67 on the tip end of the wound bobbin B so that the pressure of the butt end of the bobbin against the driver-chuck 65 is relieved. The clutch-spring 48 will then act to slide the winding spindle 40 forwardly and disengage the clutch-member 45 from the member 35 (Fig. 5) to arrest the rotation of the winding spindle and the traverse-cam 50 driven therefrom. In this way the winding operation is arrested in the manner and for the purpose as more fully explained in connection with the method of operation of the complete machine.

The dead spindle 68 and its chuck 67 are operated from the rod 350 through means of an arm or lever 370 (Fig. 17) pivoted on a pin 371 held in a bearing formation 372 on the bracket 5. The opposite end of the lever 370 carries an upstanding stud 373 (Fig. 18) engaging in a slot 375 formed in the periphery of the slidable spindle 68. Preferably there are a plurality of the slots 375 in the spindle 68 spaced apart for adjusting the chuck 67 at different distances from the driver-chuck 65 to accommodate bobbins of various lengths. The lever 370 is formed with a bore 376 through which the sleeve 367 projects and one side of the lever has a rounded protuberance 380 engageable with the flange 366 on the sleeve. A secondary spring 385 fastened to the end of the lever 370 and anchored to a pin 386 in a portion of the bracket 5 tends to rock said lever to maintain its protuberance 380 in contact with the flange 366 on the sleeve 367; the co-action between the elements described above being more particularly explained in connection with the method of operation of the complete machine.

It will be seen by reference to Fig. 4 that the periphery of the cam 290 is formed with a slight rise or hump 303 which, when it is engaged with the roller 355 on the lever 352, acts through the link 357 and rod 350 to slide the rod rearwardly sufficiently to cause it to be held by suitable detent-means, later described, engaging the end of the coupling rod 360. This latching of the rod 350 in its retracted relationship permits the heavier spring 365 to operate the chuck 67 with sufficient pressure to hold the bobbin against the driver-chuck 65 with the clutch-members 35 and 45 in engagement for driving the winding mechanism, this relationship of the parts occurring after a bobbin has been donned in winding position.

Yarn-end retrieving and severing means

It is explained in our prior application that the strand of yarn delivering from a source of supply, not herein shown, through the traversing yarn-guide (Fig. 1) to the wound bobbin is retrieved as the winding is completed and carried toward the butt end of the fresh bobbin for attaching it thereto. The means for attaching the retrieved strand of yarn to the bobbin B consists in a ferrule f surrounding its barrel and having a serrated edge with prongs for catching the yarn thereunder in the manner explained in United States Letters Patent No. 2,614,771 dated October 21, 1952. As explained in our prior application first referred to herein, the yarn-retrieving and cutting off means consists of two slidable clips which travel in opposite directions longitudinally of and beneath the wound bobbin. The structure and arrangement of the yarn-clips 390 and 395 shown herein are substantially the same as in our prior application for patent which also discloses means for traveling the clips. However, the clip-operating means of the present invention is embodied in a construction somewhat different from that of the prior application and therefore this means is herein described in connection with the cycling mechanism of the present machine. As shown in Figs. 7, 11 and 12, the yarn-retrieving clip 390 is carried on a slidable right-angular plate 396 fastened to a rack-bar 397; while the clip 395 is mounted on a similar plate 398 attached to a rack-bar 399. Referring to Fig. 7, the rack-bars 397 and 399 for traveling the clips 390 and 395 are reciprocated by a series of pinions and gears, later described. The rack-bar 397 is mounted to slide in a slotted bearing 400 (Figs. 15 and 16) formed in the upper rail 200 of the bracket 5, while the rack-bar 399 is slidable in a similar slot 401 in the under rail 201 of the bracket 5; the upper bar 397 being held in its slot by the plate 139, previously referred to, and the lower bar 399 held in its slots by a plate 402 underlying the bracket 5. Referring to Figs. 7 and 15, the upper rack-bar 397 is driven by a gear 410 fast on a short shaft 411 journaled in a bearing in the crosspiece 204 of the bracket 5. The shaft 411 carries a pinion 412 fast on its outer end. The other rack-bar 399 is operated by a gear 415 fast on a shaft 416 journaled in the crosspiece 205 of the bracket 5. The shaft 416 carriers a relatively small pinion 417.

The two pinions 412 and 417 mesh with the teeth of a driver rack-bar 420 which is operated from the cycling mechanism in the casing 2. The rack-bar 420 is mounted to slide on rollers 421 and 422 journaled on the under rail 201 of the bracket 5. The end of the driver rack-bar 420 is connected at 423 to a rod 425 which is slidably mounted in a bushing 426 in the end wall of the casing section 3 and other bearings such as that designated 427 in Fig. 7. The end of the rod 425 within the casing section 3 is connected by a coupling 428 (Fig. 4) to a link 429 which is pivotally joined to a lever 430. The lever 430 is pivoted on a pin 431 in the bracket 84 to adapt it to be oscillated by a crank-pin 435 on the combination cam-and-crank disk 290, previously described. For this purpose a link 436 pivoted on the crank-pin 435 has its opposite end pivotally connected at 437 to the lever 430. Rotation of the combination cam-and-crank disk 290 will thus cause the lever 430 to be oscillated to slide the rod 425 and thereby the rack-bar 420 in opposite directions. Through this means the pinions 412 and 417 are rotated to drive their connected gears 410 and 415 which mesh respectively with the rack-bars 397 and 399 for traveling the clips 390 and 395.

Clip-operating means

Due to the fact that the rack-bar 397 carrying the clip 390 engages with the teeth on the gear 410 above its axis and the rack-bar 399 carrying the clip 395 engages with the gear 415 below its axis, the two rack-bars will be traveled in opposite direction as the driver-rack 420 moves in each direction. During the winding of the bobbin the upper clip 390, called for convenience the "retriever," is positioned to the right of the tip end (Fig. 6) of the wound bobbin, while the lower clip 395 is positioned some distance rearwardly from the tip end of the bobbin and each clip is first given a slight movement in the reverse direction from that in which it is eventually traveled to perform its functions. That is to say, the upper clip 390 is initially moved slightly to the right, as viewed in Fig. 11, while the lower clip 395 is initially shifted slightly to the left, this action being effected as the crank-pin 435 on the crank-disk 290 crosses center when the cam-shaft 280 starts to rotate. This initial reversed motion of the two clips is for the purpose of adjusting their elements in position for performing their functions. That is to say, as the lower clip 395 moves to the left, as viewed in Fig. 11, it engages abutments which act to open its severing means while also releasing its resilient jaw to open it for gripping the yarn end, this setting of the clip being explained more fully in our prior application first referred to herein. During the motion of the upper clip or retriever 390 to the right, as viewed in Fig. 11, it is operated by a finger 457 on the plate 364 to open its jaws as explained in our prior application. The clip 390 is also operated for a different purpose, that is, to set it for engaging the yarn-guide 125 to lift its arm 155 (Figs. 11, 13 and 36) and disengage the screw-threads 156 therein from the screw-threads 124 on the traverse-rod 105; whereafter, when the clip is slid to the left it will propel the yarn-guide back to first position for winding a new bobbin.

Yarn-guide releasing and returning means

The means for holding the yarn-guide 125 released from engagement with the traverse-rod 105 consists in a rockable lever 440 pivoted on a pin 441 in the plate 396 which mounts the clip 390. The lever 440 is formed with an upstanding lug 443 engageable with the beveled end 444 of a cam-bar 445 fastened to the top of the bracket 5 by screws 446. The screws 446 extend through slots 447 in the cam-bar 445 to adapt it for longitudinal adjustment to position it for engagement with the lever 440. The forward end of the lever 440 is formed with an upstanding lug or finger 450 adapted to engage under the inclined edge 451 of a downwardly-projecting end portion of the arm 155 on the yarn-guide 125 as shown in Fig. 13. As the finger 450 slides under the inclined edge 451 on the arm 155 it lifts the arm to raise it from the threads on the traverse-rod 105. The finger 450 then engages a shoulder 452 at the end of the inclined edge 451 to slide the yarn-guide 125 along the rod 131 and return it to first position to start the winding of a new bobbin, this action taking place as the clip 390 is moved toward the left to the position shown in Fig. 9. During this return of the yarn-guide 125 the yarn connected to the wound bobbin being doffed is drawn downwardly through the guide-eye 150 and this length of the strand is caught between the jaws 455 and 456 of the clip 390 and seized therein to carry it into position for fastening the end to the new bobbin B. As the yarn slides along the barrel of the newly donned bobbin it is caught under the prongs on the ferrule *f* and pinched for attaching it thereto; the yarn trailing from the doffed bobbin being severed from the new bobbin by the action of the other clip 395 as explained in our application first referred to herein.

Bunch-builder

At the start of winding a new bobbin a bunch is formed at the butt end of its barrel during the first several traverse strokes of the yarn-guide 125. Means are provided for initially restricting the extent of the traverse of the yarn to wind the bunch by holding the strand leading from the guide to the bobbin until a predetermined number of coils have been laid on the barrel of the bobbin. The bunch-builder as herein shown consists in a rockable element 460 (Figs. 8, 9 and 10) having two arms 461 and 462 which straddle the barrel of the bobbin B when in operative position and are connected together by a vertical strip 463. The bunch-builder 460 is swivelly mounted on a bracket 464 (Fig. 10) fastened to the side of the end wall of the casing section 3 and formed with ears 465 and 466 at the top and bottom for mounting the ends of a vertical pin 467 on which the blunch-builder is pivoted. A spring 470 coiled around the pin 467 has one end connected to the bracket 464 and its opposite end bearing against the side of the upright strip 463, thus tending to swing the bunch-builder 460 rearwardly to maintain it in inoperative position as shown in Fig. 8. The upper arm 461 of the bunch-builder 460 is formed with a curved tail-piece 471 adapted to strike against the side of the end wall of the casing section 3 when the bunch-builder is swung rearwardly under the tension of the spring 470. The lower arm 462 of the bunch-builder 460 has an angular offset portion which forms a cam-edge 472 and is then extended in a straight terminal portion 473. The angular cam-edge 472 of the arm 462 is normally positioned as shown in Fig. 8 to adapt it to be engaged by a lug 475 formed on a strip 476 (Fig. 9) fastened to the depending portion 477 of the plate 396 which carries the clip 390. When the clip 390 is slid toward the left, as viewed in Figs. 8 and 9, the lug 475 rides along the cam-edge 472 of the arm 462 to swing the bunch-builder 460 outwardly and thereby move its upper arm 461 forwardly into the position shown in Fig. 9; the yarn strand leading downwardly from the guide 125 being at this juncture drawn across the edge of the arm 461 which has an abutment 474 at its outer end to prevent the strand from sliding off therefrom. With the arm 461 held in this position the yarn leading from the guide 125 and fastened to the bobbin B will be restricted in its traverse during the first several strokes of the guide to cause it to be wound into a bunch in the manner described in our prior application first referred to herein. The bunch-builder 460 is latched in its operative position, shown in Fig. 9, after the retriever-clip 390 starts back towards the tip end of the bobbin B by means as next described. Mounted on the rod 163 which carries the arcuate bobbin-donning arms 245 and 246 is a latching lever 480 adapted to engage with a tail portion 471 on the bunch-builder arm 461. The latching lever 480 is formed with a bifurcated bearing portion or yoke 482 pivoted on the rod 163 with a pair of collars 483 and 484 between its bifurcations for locating it in position. Each of the collars 483 and 484 is secured fast to the rod 163 to turn therewith by suitable means such as a set-screw 485. A pin 486 projecting radially from the collar 484 is adapted to engage with the crosspiece of the yoke 482 to sustain the lever 480 in its uppermost position against the tension of a helical spring 487. One end of the spring 487 is hooked to an arm 488 extending rearwardly from the crosspiece of the lever 480 and its opposite end anchored to a pin 238 (Figs. 6 and 14) in the end wall of the casing section 4. The main arm 490 of the lever 480 is adapted to strike against the upper ear 465 on the bracket 464 (Fig. 10) to limit the downward swinging motion of the lever under the tension of the spring 487. A downwardly-extending arm 491 on the lever 480 is adapted to engage behind the tail-piece 471 on the upper arm 461 of the bunch-builder 460 to latch the latter in its forward or operative position after the retriever-clip 390 releases the bunch-builder as it reverses its motion and travels to the right.

When the arms 245 and 246 are swung downwardly to don a new bobbin the turning of the rod 163 moves the pin 486 away from the crosspiece on the latching lever 480 to allow the spring 487 to swing this lever downwardly into the position shown in Fig. 10 to latch the bunch-builder 460 for holding it in its forward position shown in Fig. 9, this action taking place before the release of the bunch-builder by the retriever-slip 390. Then, as the arms 245 and 246 are raised the pin 486 is carried back to engage the crosspiece on the latching lever 480 to raise said lever and release the bunch-builder arm 461 whereby its spring 470 will return it to first position shown in Fig. 8.

Cycling-control means

The means for connecting the drive to the cycling-cam shaft 280 which actuates the doffing and donning means and other elements of the automatic mechanism is under the control of the rotatable rod 131, previously described as extending out through the end wall of the casing section 3 and forming the support on which the yarn-guide 125 slides during its reciprocation to traverse the yarn on the bobbin. The control-rod 131 is normally held against rotation by detent-means that are eventually released as the yarn-guide 125 reaches the end of its feed along the winding bobbin and engages with certain instrumentalities to be later described. The detent-means which hold the control-rod 131 inoperative are shown in Figs. 31 to 35 and arranged to cooperate as later explained. The eccentric ring or annulus 60 (Figs. 25 to 28), previously described as mounted on the eccentric hub 59 of the traverse-cam 44, is continuously oscillated during the rotation of the cam and is employed as the moving element for releasing the detent-means which maintain the cycling-cam shaft inoperative. The eccentric annulus 60 is pivotally connected by a pin 500 to the end of an oscillatable lever or arm 501 which is pivoted on a pin 502 fast in the end wall of the casing section 3. Also pivoted on the pin 502 is a lever 504 which forms the detention means for preventing the sliding of the horizontal rod 350 which operates the dead-spindle 68 to retract the chuck 67 and release the pressure of the wound bobbin on the driver-chuck 65. The first slight retraction of the chuck 67 allows the spindle 40 to slide forwardly under the force of the clutch-spring 48 to disengage the clutch-elements 35 and 45 and arrest the winding operation. The rod 350, as previously described, is connected to an enlarged coupling member 360 joined to the end of the link 357 which connects the rod to its operating lever 352. Normally, the end of the coupling 360 is engaged with the side of the lever 504, see Figs. 4 and 25, to prevent the rod 350 from sliding forwardly; an enlarged hole 505 in the lever 504 being adapted to be shifted into alinement with the coupling 360 when the lever is rocked counter-clockwise into the position shown in Fig. 28. Normally, during the winding of a bobbin the rotation of the hub 59 on the traverse-cam 44 merely causes the eccentric annulus 60 to oscillate the arm 501 back and forth about the pivot-pin 502 without any concurrent action. However, a lug or finger 506 on the arm 501 is adapted to engage with a shoulder 507 at the end of a detent-pawl 510 for causing the oscillation of the arm 501 to rock the lever 504 and release the rod 350. The pawl 510 is pivoted on a pin 511 in the end of the lever 504 and is formed with a finger 512 for normally holding its shoulder 507 out of range of the lug 506 on the arm 504. For this purpose the finger 512 engages with a lug 513 on an adjustable member 515 connected to an elbow-shaped lever 517 that is pivoted on the control-rod 131 previously referred to. The member 515 which is also mounted on the rod 131 has a slot 519 at its outer end through which extends a screw 520 for fastening the member in adjusted position on the elbow-shaped lever 517. The member 515 may thus be set in accurate position for holding the detent-pawl 510 inoperative during the oscillation of the arm 501.

Figure 25:
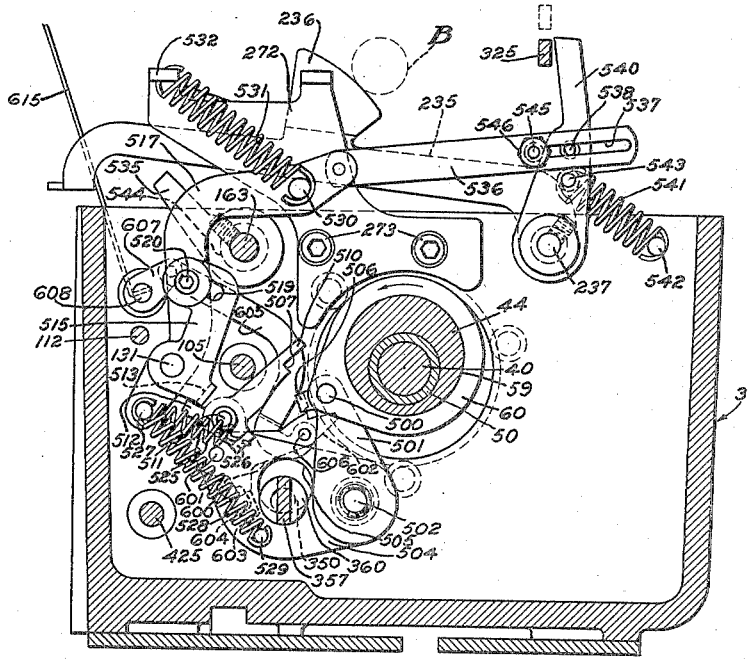
Fig. 25 is a transverse sectional view through the casing showing the traverse-cam shaft and the means actuated therefrom for releasing the detent-means to initiate operation of the cycling mechanism.

A helical spring 525 fastened at one end to a lug 526 on the detent-pawl 510 is connected at its opposite end to a pin 527 in the lever 517, thus tending to rock the detent-pawl clockwise to move its shouldered end into position for engagement with the finger 506 on the arm 501 when the pawl is released from the member 515. A longer spring 528 connected to the pin 527 has its opposite end hooked to a pin 529 projecting from the lever 504, thus tending to rock the lever 504 upwardly to maintain it in latched engagement with the end of the coupling 360 as shown in Figs. 4 and 25. The upper crooked end of the lever 517 carries a pin 530 to which is connected a spring 531 having its opposite end hooked through a lug 532 on the bracket 272, previously mentioned as fastened to the end wall of the casing section 3.

Figure 27:
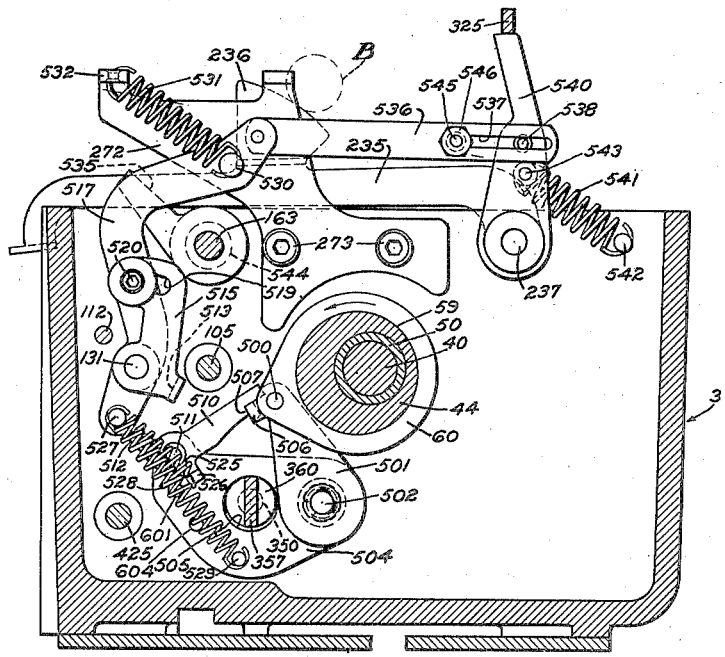
Fig. 27 is a similar view showing the detent-means released.
Figure 28:
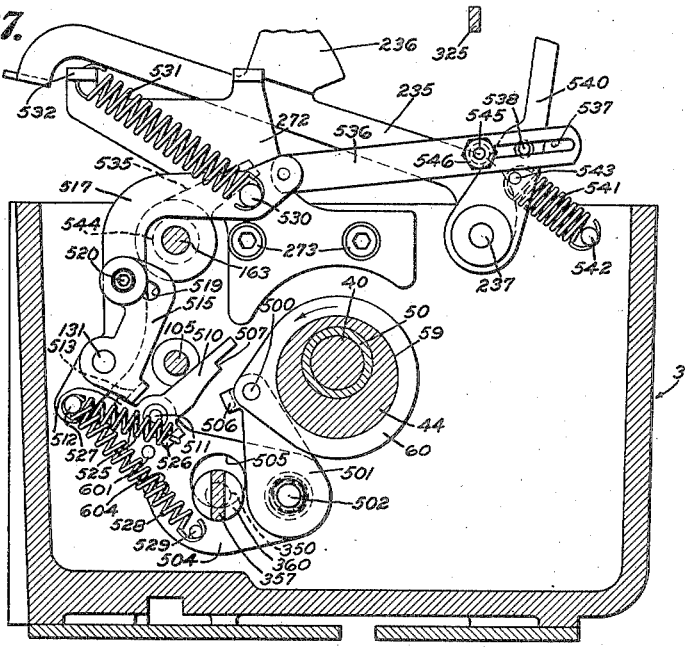
Fig. 28 is a similar view showing the parts restored to first position.

A lever 535 having its hub fast on the shaft 163, previously described as for operating the bobbin-donning arms 245 and 246, is adapted to engage with the pin 530 to rock the lever 517 in clockwise direction to restore the cycling-control means to normal position as shown in Fig. 28. Pivotally connected to the upper end of the lever 517 is a link 536 having a slot 537 in its opposite end through which projects a pin 538 on an upstanding portion of a lever 540. The lever 540 has its hub fast on the stud 237, previously mentioned, to which the lever 235 is fixedly mounted; this latter lever being previously described as adapted to be engaged and operated by the lowermost bobbin in the chute 210. A spring 541 anchored to a pin 542 in the end wall of the casing section 3 has its opposite end connected to a pin 543 in the lever 540 for normally rocking the latter in clockwise direction to raise the lever 235 as shown in Fig. 28 when there is no bobbin resting thereon for holding the lever depressed. It is here noted that downward motion of the lever 235, when freed, is limited by the flanged end of the bushing 544 (Figs. 2, 7 and 27) which projects through the end wall of the casing section 3 and forms a stop.

Figure 29:
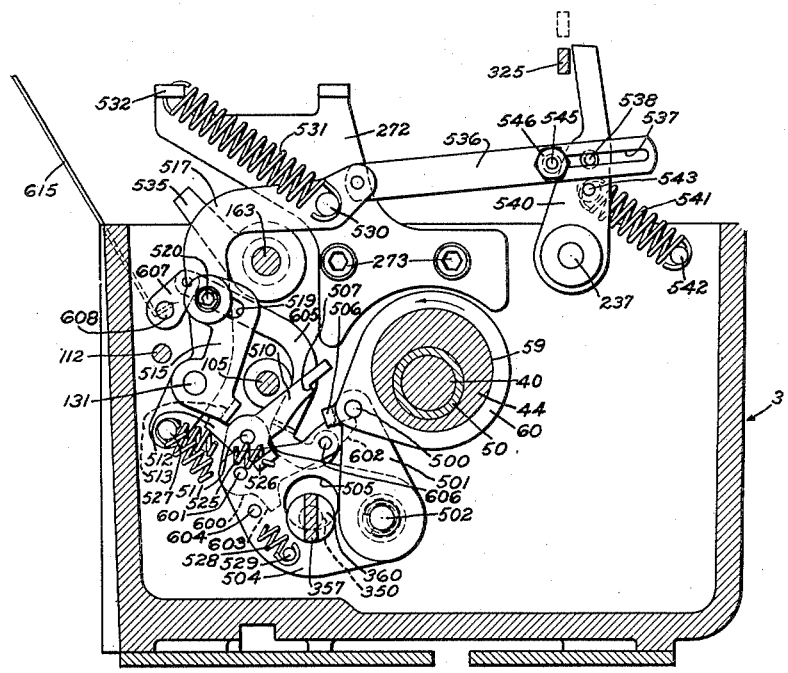
Fig. 29 is a similar view showing the stopping mechanism of the machine adapted to be actuated by a breakage-lever upon rupture or exhaustion of the yarn being wound.

A shouldered stud 545 having its reduced end projecting through the slot 537 in the link 536 is threaded at its end to receive a nut 546 for fastening it rigidly on the link. The stud 545 serves as a stop as shown in Figs. 25 and 29 for preventing the lever 540 from swinging toward the left to engage with the lever 325 (Fig. 3), previously described as cooperating with the lever 330 and lever 319 for controlling the engagement of the clutch that connects the drive to the cycling-cam shaft 280.

*Detent-means actuated by yarn-guide for initiating operation of the cycling mechanism*

As the yarn-guide 125 reaches the end of its feed and completes the winding of a bobbin its actuates means for releasing the detent-means that control the operation of the cycling-cams. Referring to Figs. 7 and 8, this certain detent-means comprises a so-called sizing-yoke 550 slidably mounted on the control-rod 131 and connected therewith for rocking said rod and thereby the elbow-shaped lever 517 within the casing section 3 at the forward end thereof. Referring to Figs. 7, 8 and 31 to 36 the yoke 550 extends along substantially the full length of the control-rod 131 and is formed with ears 551 and 552 at its ends loosely mounted on the rod 131 to adapt the yoke to slide longitudinally thereof. The yoke 550 is normally held in the position shown in Fig. 7 during the winding operation under the tension of a spring 555 fastened to a pin 556 in the yoke and anchored to an ear 557 on the plate 139 fastened to the top of the bracket 5. A stud 569 screwed through the rod 131 has its enlarged head 561 fitting between the upper and lower flanges of the yoke 550 to adapt the stud to rock the rod when the yoke is swung downwardly into the position shown in Fig. 36. The yoke 550 has a right-angular member 562 suitably fastened thereto to form its under flange 563 and provided with a finger 565 projecting laterally from its vertical flange portion. The finger 565 is adapted to engage with a series of steps 566, 567 and 568 on a latching plate 569 fastened in a slot in the upper rail of the bracket 5 by a screw 564. The upper step 566 on the plate 569 normally holds the yoke 550 in its uppermost or substantially horizontal relationship as shown in Figs. 31 and 32 under the tension of the spring 555 which maintains the yoke in its position toward the right as viewed in Fig. 7.

The finger 565 is disengaged progressively from the steps on the plate 569 to adapt it to rock down into the position shown in Fig. 36 by the engagement of the yarn-guide 125 with a sizing-yoke trip-plate 570. The member 570 is formed of sheet-metal with a downwardly-extending portion 571 fastened to the yoke 550 and is provided with a forwardly-extending arm 572 which reaches outwardly above the rod 131. The member 570 has a downwardly-directed portion 573 provided with an abutment edge 574 and a horizontal finger-like extension 575 (Fig. 35) which acts as a lifting element for raising the arm 155 of the yarn-guide 125 to release it from the threads 124 on the traverse-rod 105. The abutment edge 574 on the member 570 is adapted to be engaged by the edge of the lower arm 155 of the yarn-guide 125 (Fig. 31) as the guide reaches the end of its forward stroke whereby to slide the yoke 550 to the right and release the finger 565 from the first step 566 on the detent-plate 569. The release of the finger 565 allows the yoke 550 to rock slightly and turn the rod 131 as shown in Fig. 34 but the yarn-guide 125 is not released from the threads on the traverse-rod 105 at this juncture. That is to say, it requires further movement of the yoke 550 to release the yarn-guide 125 from the traverse-rod 105 and this further movement is accomplished by the arm 155 on the yarn-guide engaging with the end of a pawl 580 pivoted on a stud 581 in the down-turned portion 573 of the member 570. The yarn-guide arm 155 will then ride back on the elongated edge 575 of the member 570 but at its next stroke forward the pawl 580 will have been swung upwardly into the position shown in Fig. 35 by a spring 585. The spring 585 is coiled around the stud 581 on which the pawl 580 is pivoted with one end held by the lateral arm 572 of the member 570 and its opposite end engaging an upright finger 586 on the pawl 580, it being understood that at this juncture the yoke 550 has been swung into the position shown in Figs. 33 and 34 to bring the end of the pawl into the path of the yarn-guide arm 155. Then at the next forward stroke of the yarn-guide 125 its arm 155 will engage the end of the pawl 580 to slide the member 562 and yoke 550 to the right as viewed in Fig. 35 to release the finger 565 from the second step 567 on the detent-plate 569 so that the yoke 550 is permitted to rock into the position shown in Fig. 36. The yoke 550 will thereby rotate the control-rod 131 and swing the lever 515 into position to release the pawl 510 (Fig. 26) and initiate the several operations which start the cycling of the cycling-cam shaft 280. This action of the trip-mechanism is explained more completely in connection with the method of operation of the complete machine.

*Buffer-spring for relocating yarn-guide in position for starting the winding of a new bobbin*

It has been explained that the yarn-guide 125 is returned to initial winding position by the retriever-clip 390 as it travels toward the end of the casing 2. For taking the thrust of the yarn-guide as it moves back rapidly in this direction a buffer-spring 590 (Fig. 8) fastened at 591 to the rearward portion of the yoke 550 has a resilient inclined finger 592 extending forwardly into the path of the guide for engagement therewith when the guide reaches the end of its travel. The buffer-spring 590 takes the thrust of the guide to prevent its momentum from carrying it beyond the starting point for winding a bunch on the bobbin and remaining out of range of the screw-threads on the traverse-rod 105, the spring-arm 592 acting to force the yarn-guide back into proper relation to the threaded portion of the traverse-rod 105 and cause it to be engaged therewith after the retriever-clip has reversed its motion to return it to its initial position of rest.

Referring to Figs. 6, 9 and 14, a right-angular plate 593 fastened at 594 to the front plate 364 on the bracket 5 has an upstanding finger which engages the beveled end 442 of a projection on the yarn-guide retrieving lever 440 on the clip 390 to rock the lever for releasing it from engagement with the shoulder 452 on the guide-arm 155.

Spindle-brake

Means are provided for braking the winding spindle 40 to prevent it from continuing its rotation after the relief of pressure of the chuck 67 on the tip end of the bobbin has released the spindle to allow it to slide forwardly and declutch it from the drive-shaft 10. A brake-element 595 fastened to the forward end of the casing section 3 at 596 (Figs. 1, 5 and 10) is provided with a downwardly-extending portion overlying the beveled rim of the drive-chuck 65. A friction pad 597 held on the rearward face of the element 595 is normally spaced slightly forward of the beveled rim of the driver-chuck 65 to provide clearance therefor so as not to interfere normally with the rotation of the spindle for driving the bobbin. As the spindle 40 moves forwardly to declutch it from the drive-shaft 10 the beveled rim on the driver-chuck is brought into engagement with the friction pad 597 to promptly arrest the rotation of the spindle.

Stop-motion for winder

Referring to Figs. 4, 25 and 29, means are provided for arresting the winding operation through the release of the detent-lever 504 which holds the rod 350 to maintain the spindle-driving clutch engaged. As shown in Fig. 29 an auxiliary pawl 600 pivoted on a pin 601 in the detent-lever 504 has a shouldered end 602 adapted to engage with the finger 506 on the arm 501 which is oscillated by the eccentric annulus 60. The pawl 600 is normally positioned as shown in Fig. 25 with its shouldered end 602 clear of the finger 506, being held in this position by a lug 603 projecting downwardly from the pawl for engagement against a pin 604 in the lever 504. The pawl 600 is raised into position for engagement with the finger 506 as shown in Fig. 29 by means of a hook-shaped lever 605, the lower end of which is pivotally connected to the pawl by means of a pin 606. The upper end of the lever 605 is pivotally connected to a crank-arm 607 fast on a rod 608 which extends through a bushing 609 in the end wall of the casing section 3 with its outer end held in a bore 610 in the tail-stock bracket 70 (Fig. 7). The rod 608 carries a wire loop 615 (Fig. 7) of inverted U-shape constituted as a breakage lever with its upper horizontal crossbar disposed in position to adapt the yarn y (Fig. 1) to draw downwardly thereacross as it feeds to the winding bobbin. Should the yarn break or its supply be exhausted the breakage lever 615 will be released to swing outwardly, thereby rocking the rod 608 to turn the crank-arm in counter-clockwise direction to the position shown in Fig. 29. The hooked end of the lever 605 will thus be drawn upwardly to raise the pawl 600 for engaging its shouldered end with the finger 506, whereupon the oscillation of the eccentric annulus 60 will cause the finger 506 to force the pawl 600 toward the left and carry the lever 504 downwardly to aline its hole 505 with the coupling 360 as shown in Fig. 27; this action being the same as when the pawl 510 is actuated to rock the lever 504. Upon release of the coupling 360 the rod 350 will be slid forwardly to slide the dead-spindle 68 and withdraw the chuck 67 sufficiently to remove its pressure on the end of the winding bobbin. The pressure at the end of the bobbin in the drive-chuck 65 will therefore be released to permit the winding spindle 40 to slide forwardly and declutch it from the drive-shaft 10 in the manner as previously explained. In this way the winding operation is arrested in case of failure of the yarn to be supplied to the yarn-guide to wind it on the bobbin.

Method of operation of machine

Assuming that a bobbin is in place on the machine with its butt end held in the driver-chuck 65 on the winding spindle 40 and its tip end held in the tail-stock chuck 67, the spring 365 (Fig. 18) will act to force the spindle toward the left against the tension of the spring 48 (Fig. 5) to engage the clutch-members 35 and 45. The spindle 40 is thereby clutched to the drive-shaft 10 to cause it to be rotated by the pulley 11 connected by the belt T to the electric motor M. As the bobbin B is thus driven by the spindle 40 the cam 44 is rotated therefrom through the train of gearing shown in Figs. 2, 3 and 22 and previously described. The traverse-rod 105 is reciprocated by engagement of the roll 106 with the helical groove in the cam 44. Reciprocation of the traverse-rod 105 causes the yarn-guide 125 to traverse the yarn back and forth at the base end of the bobbin B and at each traverse the guide is fed forwardly along the bobbin during the rotation of the traverse-rod by means of the one-way clutch 160 and the gears 164 and 120 connecting it to the rod, see Figs. 20 to 23; it having been explained that the clutch-annulus 165 is oscillated by the lever 170 actuated by contact of its roll 175 with the eccentric disk 55 on the hub of the cam 44.

At the start of winding a bobbin the bunch-builder 460 (Figs. 9 and 10) is positioned with its arms 461 and 462 projecting forwardly across the axis of the bobbin B and engaging the length of yarn leading down from the guide 125 with its end attached to the barrel of the bobbin, so as to restrict its traverse of the yarn and build a bunch at the base of the bobbin; it being understood that the end of the yarn from the supply is fastened to the bobbin B by being caught under the fingers of the ferrule f. The bunch-builder 460 is held in this operative relationship by the latching-lever 480 until a predetermined number of coils of yarn have been deposited on the bobbin, whereafter it is released and returned to inoperative position to permit the yarn to be traversed to the full extent of the stroke of the guide. As the yarn-guide 125 feeds along the bobbin B during its reciprocation relative thereto it deposits the yarn in helical coils with the zone of traverse advancing to wind the yarn in conical chases in accordance with the usual method of winding filling bobbins.

Release of detent-means for cycling-mechanism

As the yarn-guide 125 approaches the end of its advance towards the tip end of the bobbin B it actuates the trip-device to initiate the operation of the cycling-mechanism for operating the automatic donning and doffing means. During the last several forward strokes of the guide 125 the edge of its lower arm 155 makes contact with the shoulder or abutment 574 (Figs. 31 and 32) on the portion 573 of the sizing-yoke trip 570 and acts to slide the sizing-yoke 550 forwardly to eventually release its finger 565 from the uppermost step 566 on the detent-plate 569, see Figs. 33 and 34. It requires several repeated contacts of the guide with the trip 570 to shift the yoke 550 sufficiently to effect this release. The sizing-yoke 550 is then permitted to rock clockwise (Fig. 34) to a certain extent under the tension of the spring 531 (Figs. 27 and 28) connected to the elbow-shaped lever 517 which is fast on the inner end of the control-rod 131 connected by the stud 560 to rock with the yoke. During this operation the arm 155 on the yarn-guide 125 remains in engagement with the threads on the traverse-rod 105 so that the guide continues to be reciprocated by the rod. At this juncture, however, the pawl 580 on the sizing-yoke trip 570 is elevated sufficiently by the rocking of the yoke 550 to bring the end of its longer arm into range of the arm 155 on the yarn-guide so that at the next forward stroke of the guide it will make contact with the pawl to shift the yoke 550 to an increased extent sufficient to release its finger 565 from the second step 567 on the detent-plate 569. It will be observed that since the end of the pawl 580 extends some distance beyond the abutment 574 on the sizing-yoke trip 570 the extent of movement of the yoke by engagement of the arm 155 with the end of the pawl 580 is increased to insure release of the finger 565 from the second step 567 during a single forward stroke of the yarn-guide; it being understood that the pawl 580 is normally held in the position shown in Fig. 31 by the spring 585 with its finger 586 engaged against the portion 572 of the sizing-yoke trip 570. It will be understood by reference to Fig. 31 that when the finger 565 on the yoke 550 is engaged with the upper step 566 the pawl 580 is positioned below the arm 155 of the yarn-guide so that the arm will ride above it without engagement therewith. When, however, the finger 565 rides off from the first step and onto the second step 567 as shown in Fig. 34, the yoke 550 will rock sufficiently to raise the pawl 580 into position to be engaged by the arm 155 after the guide has reversed its motion to release the trip 570. Fig. 35 shows the arm 155 of the yarn-guide 125 in engagement with the end of the pawl 580, and at this juncture the finger 565 is released from the shoulder 567 so that the yoke 550 will be caused to rock to carry the finger down onto the third shoulder 568. This last rocking motion of the yoke 550 causes the pawl 580 to be rocked upwardly for engaging its extended forward portion 575 under the arm 155 of the yarn-guide 125 to thereby lift it above the traverse-rod 105 and disengage its threads 156 from the threads 124 on the rod which immediately arrests the reciprocation of the guide. In the meantime the control-rod 131 will have been rocked sufficiently to cause the spring 531 to rock the lever 517 (Fig. 27) and release the detent-means that normally maintains the cycling-mechanism inoperative and the winding means operative.

Figure 26:
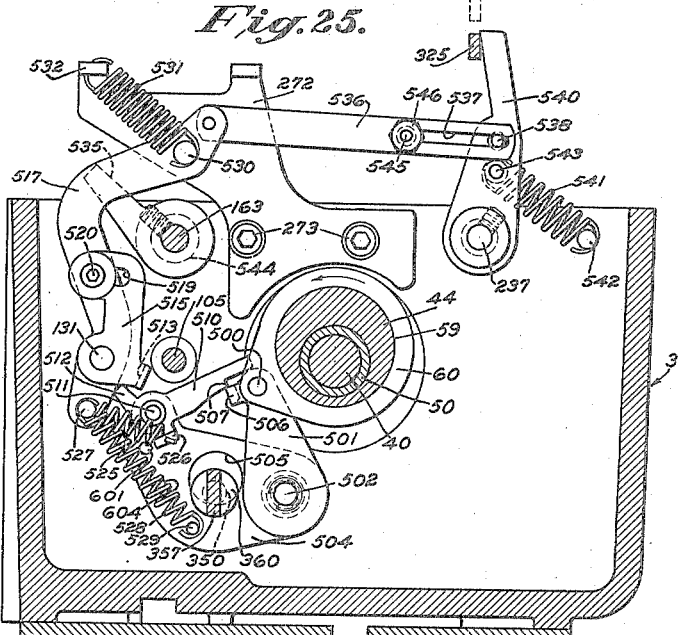
Fig. 26 is a similar view showing the parts in different relationship with the detent-means about to be released.

Referring to Fig. 4, it will be observed that when the rod 350 is held from longitudinal movement by the lever 504 (Fig. 25) the roller 355 on the lever 352, which is connected by the link 357 to slide the rod, is slightly removed from the periphery of the cam 290. This disengagement of the roller 355 from the cam 290 occurs as the roller rides over the hump 303 on the cam to rock the lever 352 for drawing the rod 350 back sufficiently for the detent-lever 504 to engage the end of the coupling 360 on the rod. The first effect of the release of the detent-means for the sizing-yoke 570 as its finger 565 rides off from the second step 567 of the detent-plate 569 is to cause the rocking of the control-rod 131 to swing the lever 517 and release the pawl 510 as shown in Fig. 26. Then, as the shoulder 507 on the pawl 510 is engaged by the lug 506 on the lever 501, which is oscillated continuously by the eccentric annulus 60, the pawl will swing the detent-lever 504 downwardly to aline its hole 505 with the end of the coupling 360, the rod 350 being thus released to slide forwardly and bring the roller 355 into contact with the periphery of the cam 290.

This first sliding motion of the rod 350 is effected by the expansion of the spring 365 along the rod between the flange 366 on the sleeve 367 and the block 362 held by the pin 363 in the end of the rod; it being understood that the block 362 is shifted with the sliding of the rod 350 and the spring 365 will expand slightly as its end remains in contact with the sleeve 367. As the pin 368 in the rod brings up against the end of the sleeve 367 it will move the sleeve with the rod, thereby displacing its flange 366 to the right as viewed in Fig. 18 to permit the lever 370 to follow this movement under the tension of the spring 385. By this series of movements of the rod 350, the sleeve 367, and lever 370, the dead-spindle 68 is caused to be slid in the same direction by the engagement of the stud 373 in the slot 375. Under this action the tail-stock chuck 67 is drawn back slightly to release the pressure on the tip end of the bobbin B. Consequently, pressure of the bobbin B against the driver-chuck 65 is relieved sufficiently to cause the spindle 40 to slide forwardly under the force of the spring 48 between the clutch-members 35 and 45. The spindle 40 is thus slid forwardly to disengage the clutch-members 35 and 45 and disconnect the drive for arresting the rotation of the spindle and the cam-shaft 44 driven therefrom.

*Initiation of drive to cycling-cam shaft*

Figure 30:
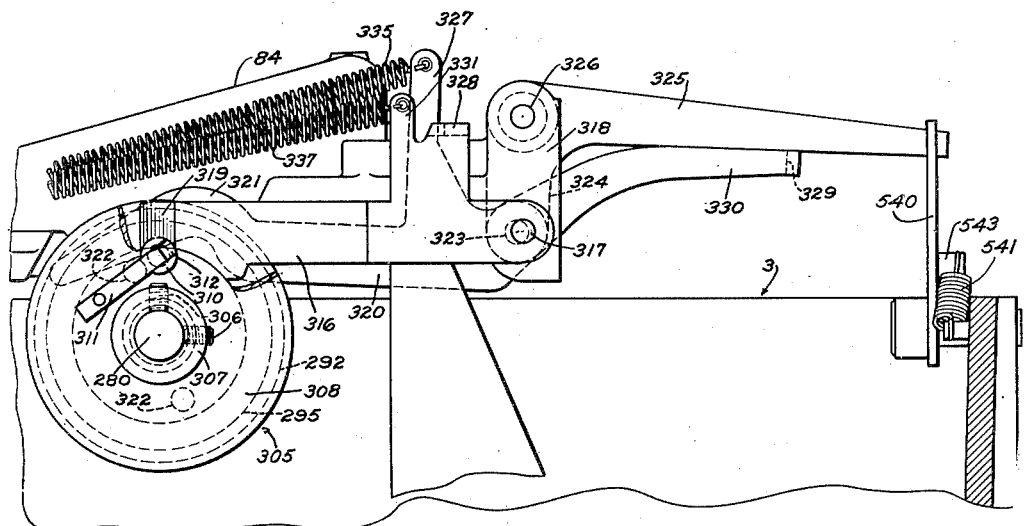
Fig. 30 is a view showing the means for operating the clutch which drives the cycling-cam shaft.

Referring to Figs. 4, 24 to 29, the cycling-control mechanism within the casing section 3 now comes into action to connect the gear 292 to drive the cam-shaft 280 by means of the clutch-element 305 fast on said shaft. Referring to Figs. 3 and 30, it has been explained that during the continuous rotation of the gear 292 by the gear-train connecting it with the main drive-shaft 10 (Figs. 4 and 24) causes the pins 322 on the gear to intermittently engage on the curved end 321 of the lever 320 and continuously oscillate said lever with its arm 330 playing up and down under the lever 325. Normally, the outer end of the lever 325 is clear of the end of the lever 540, as indicated in Fig. 29, and with a bobbin in the bottom of the magazine 210 as shown in Fig. 7, its butt end rests on the upstanding portion 236 of the control-lever 235, see dotted lines in Fig. 25, to weight it and maintain the connected lever 540 against the stop-pin 545. When, however, the elbow-shaped lever 517 is rocked by the control-rod 131 to release the pawl 510, as shown in Fig. 26, the stop-pin 545 is moved away from the lever 540 whereby under the weight of the bobbin B on the lever 235 the pin 237 is rotated to swing the lever 540 to the left or counter-clockwise as shown in Figs. 26 and 27. Now, when the lever 320 is rocked upwardly under the action of the pins 322 on the gear 292 it will cause its arm 330 to lift the lever 325 and the end of the lever 540 will ride under it as shown in Fig. 27. This engagement of the lever 540 under the end of the lever 325 holds the latter with its pivot 323 shifted towards the right into the position shown by the dotted line in Fig. 3. This shifting of the pivot 323 has the effect to draw the lever 320 towards the right as viewed in Fig. 3 so that its vertical arm 327 will engage with the laterally-extending finger 328 on the lever 316. Then, as one of the pins 322 on the gear 292 rides under the end of the lever 320 it will cause its upright arm 327 to act against the finger 328 to lift the forward end of the lever 316 and release its beveled end 319 from the helical groove in the clutch pin 310. The pin 310 is thus released to be slid axially by its spring 311 for engaging its end with one of the several holes 301 in the clutch-disk 295 carried by the gear 292. With the pin 310 thus engaged with the clutch-disk 295 (Fig. 4) the gear 292 is connected to the clutch-element 305 secured fast to the cam-shaft 280 to drive said cam-shaft.

*Cycling-cam shaft functioning*

As the cam-shaft 280 starts to rotate with the roller 355 engaged with the periphery of the cam 290 the lever 352 will be caused to swing to the right as viewed in Fig. 4 with the roller traveling down the somewhat flattened portion of the periphery of the cam located radially inward towards its axis. The lever 352 follows the periphery of the cam 290 as the rod 350 is slid to the right under the force of the auxiliary spring 385 (Fig. 18) which swings the lever 370 to force the flange 366 to the right and shift the rod 350 in the same direction. Under this augmented sliding movement of the rod 350 the lever 370 acts through the stud 373 to slide the spindle 68 towards the right as viewed in Fig. 18 so as to withdraw the tail-end chuck 67 from the tip end of the bobbin B and release its butt end from the driver-chuck 65. In this way the wound bobbin is doffed from the machine in substantially the same manner as explained in our prior application for patent first referred to herein.

*Donning empty bobbin*

During the doffing of the wound bobbin the empty bobbin B at the bottom of the magazine 210 (Fig. 6) is carried down into alinement with the driver-chuck 65 and tail-stock chuck 67 by means as next explained. As has been stated, the bobbin-donning arms 245 and 246 (Figs. 1 and 15) are fast on the shaft 163 for operation thereby. The empty bobbin B (Figs. 6 and 15) is held with its butt portion resting on the upright portion 236 if the lever 235 at one end and its opposite end supported on the rest 230, being retained in this relationship by the spring-fingers 249 and 250 carried by the horizontal rod 251 (see dotted lines in Fig. 15). The forward ends of the arms 245 and 246 are recessed in swallowtail form to adapt them to engage around the bobbin and grip it. When the arms 245 and 246 are swung forwardly and downwardly to don the bobbin the fingers 249 are moved with them by means of the bifurcated arm 253 which is mounted on the shaft 163 and held under the tension of the spring 256 (Fig. 6) to maintain sufficient pressure for yieldingly holding the bobbin in the recesses of the arms 245 and 246.

Figure 18:
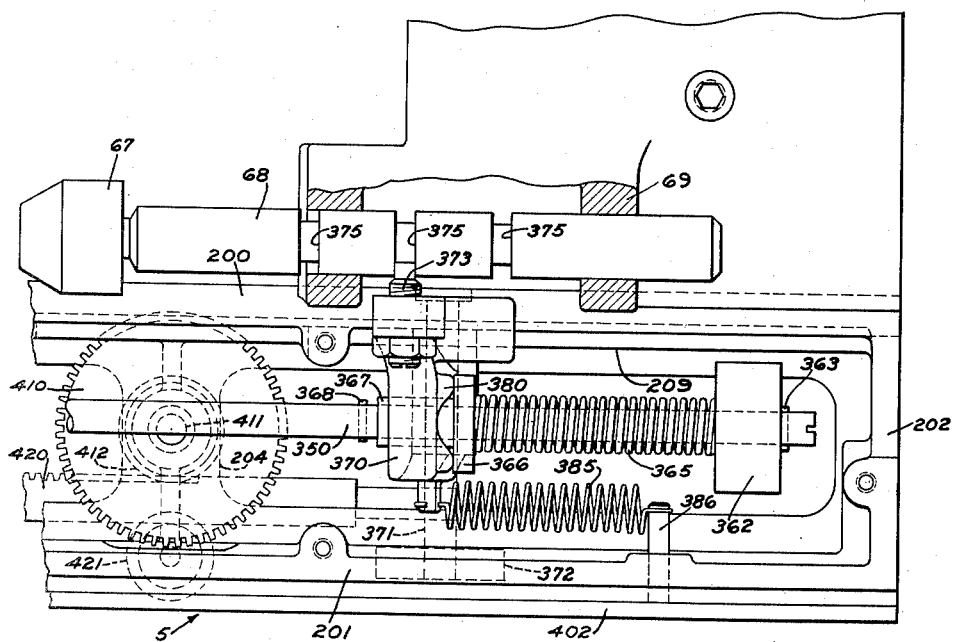
Fig. 18 is an elevational view of the same.

The shaft 163 carrying the donning-arms 245 and 246 is rotated through means of the bevel-pinion 265 driven by the gear-quadrant 267 on the lever 270 to swing the arms downwardly with the bobbin. The lever 270 is rocked by the cam 275 engaging with its roller 276 in the manner as previously explained, this action taking place immediately the cam-shaft 280 starts its rotation by the gear 292. As the donning-arms 245 and 246 reach the end of their downward stroke and the butt of the bobbin B is alined with the driver-chuck 65, the tail-stock chuck 67 is carried forward to engage it with the tip end of the bobbin (Fig. 6), this action being accomplished as next explained. At this point in the rotation of the cam-shaft 280 (Fig. 4) the portion of the periphery of the cam 299 of greatest radius will have rocked the lever 352 toward the left to slide the rod 350 in the same direction and release its pin 368 from the end of the sleeve 367 (Fig. 18). Thereupon, the end of the spring 365 bearing against the flange 366 on the sleeve 367 will slide the sleeve towards the left to rock the lever 370 and slide the dead-spindle 68 in the same direction. The tail-stock chuck 67 is thus carried into engagement with the tip end of the bobbin B to apply pressure thereto seating its butt end in the driver-chuck 65 and thereafter forcing the spindle 40 (Fig. 5) to slide axially and re-engage the clutch-members 35 and 45 to start the drive from the shaft 10. Then as the rod 350 is locked in position by the lever 504 (Fig. 4) the pressure of the bobbin against the driver-chuck 65 under the force of the spring 365 will maintain the drive connection for operating the winding elements of the machine.

As the cam 290 continues its rotation the hump 303 on its periphery is carried into engagement with the roller 355 (Fig. 3) to rock the lever 352 sufficiently for drawing the rod 350 toward the left until the coupling 360 is moved to a position for the lever 504 (Fig. 4) to be engaged with its end. At this juncture the detent-lever 504 is swung upwardly to engage against the end of the coupling 360 (Fig. 4) under the force of its spring 528; the pawl 510 having been released from the finger 506 on the lever 501 by the movement of the elbow-shaped lever 517 toward the right upon the rocking of the control-rod 131 in clockwise direction as viewed in Fig. 28. This rocking motion of the rod 131 is effected by the engagement of the lever 535 with the pin 530 on the lever 517 as the shaft 163 is rotated in clockwise direction to swing the donning arms 245 and 246 downwardly in the manner explained above. This latter clockwise rocking of the lever 517 moves the link 536 connected to its end to the right as viewed in Fig. 28, thereby causing its stop pin 545 to rock the lever 540 in the same direction and remove its end from under the lever 325. The rocking of the lever 540 then acts to swing the connected lever 235 upwardly into position to be engaged by the next bobbin B delivering from the magazine or hopper 210. Upon release of the lever 540 from under the lever 325 the parts are returned to initial relationship to permit disconnection of the driving gear 292 (Fig. 24) from the clutch 305 so as to arrest the rotation of the cycling-cam shaft 280 in the manner as next explained.

As the lever 325 is released from the end of the lever 540 the latter will rock into the position shown in Fig. 30 to carry the pivot-pin 323 for the lever 316 forwardly and thereby allow the spring 337 to swing the lever 316 downwardly so that as the clutch-element 305 continues its rotation the tapered end 319 of the lever will slide through the helical slot 315 (Fig. 24) in the pin 310 to withdraw the pin from engagement with the disk 295 carried by the gear 292. As the pin 310 is disconnected from the driving gear 292 the cycling-cam shaft 280 will come to rest after one complete revolution thereof.

*Traveling clips operation*

It will be understood that during the cycling of the cam-shaft 280 prior to arrest of its rotation the clips 390 and 395 are traveled horizontally in opposite directions for performing their respective functions. As before explained, the clips 390 and 395 are reciprocated by means of the gears 410 and 415 driven by pinions 412 and 417 (Fig. 7) and acting through the rack-bars 397 and 399 (Fig. 15). The pinion-gears 412 and 417 are driven from the rack 420 connected to the end of the rod 425, said rod being reciprocated by the lever 430 actuated from the combined cam and crank-disk 290 (Fig. 4) by means of the link 437 connecting the lever to the crank-pin 435 (Fig. 22). Referring to Figs. 11, 12 and 13, it has been explained that the clip 390 is first moved rearwardly to a slight extent to engage the finger 443 on the lever 440 with the cam-edge 444 so as to adjust said lever to engage the yarn-guide 125 for returning the latter to initial position to start the winding of a new bobbin. With the lever 440 in the position shown in Fig. 11, the clip 390 starts to travel to the left as the clip 395 slides in the opposite direction or toward the right. At this juncture the yarn-guide 125 has been allowed to swing downwardly toward the traverse-rod 105 by the rocking of the sizing-yoke 550 counter-clockwise as viewed in Figs. 30 and 35, the control-rod 131 being turned in the same direction with the restoration of the lever 517 to its initial position shown in Fig. 28. At this point the reciprocation of the traverse-rod 105 has been arrested and the threads in the arm 155 of the guide will be engaged with the threads 124 on the traverse-rod, but immediately thereafter the clip 390 advances to pick up the guide and the finger 450 on the lever 440 acts first to raise the guide to release the threads. This is accomplished by the finger 450 riding under the inclined edge 451 of the forward downturned portion of the arm 155 of the guide, see Figs. 13 and 15. As the arm 155 is thus raised to release its threads from the threads on the traverse-rod 105 the finger 450 brings up against the shoulder 452 at the end of the edge 451 and starts to propel the yarn-guide back to its initial winding position. As explained in our prior application previously referred to herein, the jaws 455 and 456 on the clip 390 act to seize the length of yarn leading downwardly through the eye 150 in the yarn-guide, this length having been drawn down from the guide by the descent of the wound bobbin as it is doffed from the winding spindle in the manner as explained above. As the clip 390 approaches the butt end of the bobbin B the lug 475 on its front plate 476 rides along the inclined edge 472 on the arm 473 of the bunch-builder 460 and swings the latter outwardly on its pivot-pin 467 against the tension of the spring 470. At this juncture the bobbin-donning arms have been swung downwardly to release the pin 486 (Figs. 6 and 10) from the arm 482 of the latching-lever 480 to permit the latter to swing downwardly under the force of its spring 487. The arm 491 of the latching-lever 480 is thus carried into position at the rear of the tailpiece 471 on the bunch-builder 460 to lock the latter in its forward operative position shown in Fig. 9. The bunch-builder 460 will then act to restrict the traverse of the yarn as the yarn-guide starts to reciprocate through its connection with the traverse-rod 105.

The yarn-guide 125 is released from the clip 390 immediately the latter reaches the end of its travel toward the left and reverses its direction to return back to the position shown in Fig. 8; the re-engagement of the yarn-guide with the traverse-bar being effected by the release of the lever 440 from the shoulder 452 (Fig. 13) on the guide. The lever 440 is swung away from the guide by the engagement of its inclined edge with the upstanding finger 593 on the bracket 5 (Figs. 6 and 9).

Yarn-severing means

As the clip 390 travels past the clip 395 moving in the opposite direction, the length of yarn trailing from the doffed bobbin is caught in the jaws of the clip 395 and severed from the yarn in the clip 390 by the cutter carried by the clip 395; this operation being explained more fully in our prior application first referred to herein. The length of yarn from the yarn-guide 125 still held by the clip 390 during the latter part of its travel will be drawn along the surface of the barrel of the bobbin B, which has at this point been donned and caught under the fingers on the ferrule f to attach its end to the bobbin as the latter starts to rotate with the winding spindle. Then as the yarn-guide is connected to the traverse-rod 105 and reciprocated thereby the yarn will be traversed under restraint of the bunch-builder 460 engaging its length leading from the guide to the bobbin whereof to form the bunch. As soon as the required number of turns or coils of yarn have been laid on the barrel of the bobbin B the bunch-builder is released from the latch-lever 490 (Fig. 10) as the lever is swung upwardly by the turning of the shaft 163 during the return of the donning-arms 245 and 246 to inoperative position. During the turning of the shaft 163 the pin 486 (Figs. 8 to 10) is rotated with it to cause it to strike the bifurcated portion 482 on the latching-lever 480 to rock said lever upwardly against the force of its spring 487. The arm 491 on the lever 480 is thus released from the tailpiece 471 on the arm 461 of the bunch-builder 460, whereupon the spring 470 will swing the arms of the bunch-builder rearwardly to return the latter to its inoperative position shown in Fig. 8. As the yarn is freed from the arms of the bunch-builder the guide 125 starts to traverse it to the full extent of its stroke and as the guide is advanced along the barrel of the bobbin the yarn is built up in conical layers in the usual manner until a full bobbin is produced. When the wound bobbing is completed the yarn-guide 125 trips the detent-means to initiate the operation of the cycling-cam shaft to once again doff the completed bobbin, don a fresh empty bobbin and perform the other operations necessary to a continuous cycle.

Stopping mechanism

It has been explained that the presence of a bobbin in position to weight the lever 235 is necessary for effecting release of the detent-means to start the cam-shaft cycling. In the absence of a bobbin in delivering position in the magazine, due to exhaustion of the supply or other cause, the lever 235 remains in its uppermost position (Fig. 28) so that the lever 540 cannot cooperate with the lever 325 to initiate the operation of the cycling mechanism. In this situation, however, the operation of the winding mechanism is arrested upon completing the winding of the bobbin in the machine. As the yarn-guide reaches the end of its advance along the bobbin B and trips the detent-means to release the sizing-yoke 550, in the manner as previously explained, the control-rod 131 is rotated to shift the lever 517 and release the pawl 510, whereupon the finger 506 on the knock-off lever 501 will engage the pawl to swing the detent-lever 504 downwardly into the position shown in Fig. 27, thereby releasing the coupling 360 on the control-rod 350. Upon release of the coupling 360 the rod 350 is free to slide forwardly and cause the lever 370 to slide the dead-spindle 68 and withdraw the tail-stock chuck 67 toward the right as viewed in Fig. 18. The pressure of the chuck 67 against the tip end of the bobbin B is thus relieved sufficiently to permit the spindle 40 to slide forwardly for declutching it from the drive-shaft 10. The operation of the winding mechanism is thereby arrested with the wound bobbin still held in connection with the spindle.

Yarn-failure stopping mechanism

As previously indicated, means are provided in the machine for arresting its operation when the yarn breaks or its supply is exhausted. It has been explained that the yarn feeding from a supply to the thread-guide 125 draws across the horizontal bar of the U-shaped breakage-lever 615 (Figs. 1 and 7) to maintain the latter in erect position as indicated in Fig. 15. The breakage-lever 615 is mounted on the outboard length of the rockable rod 608 and should the yarn break or its supply be exhausted the lever will be released to rock the rod clockwise as viewed in Fig. 15. The inner end of the rod 608 carries the crank-arm 607 which is pivoted to the hook-shaped lever 605 connected at its lower end to the pin 606 in the auxiliary pawl 600 (Fig. 29). The pawl 600 is pivoted on a pin 601 in the detent-lever 504 and when the rod 608 is rocked to the position shown in Fig. 29 by release of the breakage-lever 615 the crank-arm 607 will act through the hooked lever 605 to raise the pawl 600 into position to be engaged by the lug 506 on the oscillating knock-off lever 501. When this engagement takes place the detent-lever 504 will be rocked downwardly about its pivot 502 to aline its hole 505 with the coupling 360, thereby releasing the rod 350 to allow it to slide forwardly for operating the lever 370 (Fig. 17) and withdraw the tail-stock clutch 67 sufficiently to relieve its pressure on the end of the wound bobbin B. In this way the pressure of the bobbin against the driver-chuck 65 is relieved to allow the winding spindle 40 to slide forwardly and declutch it from the drive-shaft 10. To start the operation of the machine after it has been arrested in the manner last explained it is necessary to either renew the supply of yarn or repair the break therein and attach its end to the winding bobbin. Manually-operated means such as shown in our prior application first referred to herein may be provided for shifting the tail-stock chuck 67 into position to force the new bobbin against the driver-chuck 65 and slide the spindle 40 rearwardly to re-engage the clutch means; this mechanism not being herein illustrated or described as it has no direct relationship to the present invention.

It will be understood by reference to the foregoing specification that the present invention provides an entirely automatic winding machine for continuously producing filling bobbins by furnishing bare bobbins to the winding mechanism; donning the bobbins in connection with the winding spindle; doffing completely wound bobbins; severing the yarn trailing from the wound bobbins; attaching the end from the supply to the fresh bobbin; thus operating in a closed cycle to perform all the necessary functions without attention on the part of the operator except to supply the bobbin magazine with empty bobbins.

While the present improved machine is herein shown and described as embodied in a preferred form of construction, it is to be understood that modifications may be made in the structure and arrangement of the elements thereof without departing from the spirit or scope of the invention. Therefore, without limiting ourselves in this respect, we claim:

1. In a winding machine, a rotary winding spindle, means for journaling said spindle to adapt it to slide longitudinally, driving means for connection with said spindle to rotate it, a spring for sliding the spindle to disconnect it from the driving means, a bobbin connected to said spindle for rotation thereby, resilient means for applying pressure against the end of said bobbin to maintain the spindle in connection with the driving means, detent-means for normally maintaining said resilient means applying pressure on the bobbin to hold the spindle connected to the driving means, means for releasing said detent-means as the bobbin reaches its predetermined size, means for initially relieving the pressure against the end of the bobbin to allow the spindle to slide under the force of said spring to disconnect it from the driving means, means to further relieve the pressure against the end of the bobbin to release it for doffing it from the machine, means operative thereafter to don a new bobbin in connection with the spindle, and means to reapply full pressure against the end of the bobbin to slide the spindle and reconnect it to the driving means to commence winding on the new bobbin.

2. In a winding machine, a rotary winding spindle, means for journaling said spindle to adapt it to slide longitudinally, driving means connectible with said spindle for rotating it, resilient means for disconnecting said driving means from the spindle to arrest its rotation, a bobbin connected to said spindle for rotation thereby, bobbin-engaging means acting to press against the end of said bobbin to cause it to maintain the spindle in connection with the driving means, means for initially relieving the pressure of said bobbin-engaging means to allow the spindle to slide to a limited extent to adapt the resilient means to disconnect it from the driving means and arrest its rotation, said initial relief of pressure of the bobbin-engaging means being insufficient to cause doffing of the bobbin, means operative subsequently thereto to release the bobbin-engaging means sufficiently for doffing the bobbin from the winding spindle, means operative thereafter for donning a new bobbin in connection with the spindle, and means for reapplying pressure against the end of said new bobbin to slide the spindle and connect it to the driving means for rotating the bobbin to wind thereon.

3. In a winding machine, a drive-shaft, a rotary winding spindle extending axially of said drive-shaft, means for journaling said winding spindle to adapt it to slide longitudinally, clutch-means for connecting said drive-shaft with the winding spindle to rotate the spindle, resilient means for normally maintaining said clutch-means disengaged, a driver-chuck on the winding spindle for rotating a bobbin engaged with said chuck, a second chuck for engaging the opposite end of said bobbin, resilient means for operating said last-named chuck to cause it to force the bobbin against the driver-chuck and slide the spindle to engage the clutch-means for rotating the bobbin, means for releasing said last-named resilient means to permit the spindle to slide to a sufficient extent for disengaging the clutch-means without releasing the bobbin from the spindle, further means for releasing said last-named resilient means to cause the second chuck to free a wound bobbin for doffing it from the spindle, means operative thereafter to don a new bobbin in connection with the spindle, and means to apply pressure to the end of the new bobbin to slide the spindle for engaging the clutch-means to restart the winding on the new bobbin.

4. In a winding machine, a drive-shaft, a winding spindle separate from said drive-shaft and extending axially thereof, clutch-means for connecting the drive-shaft to rotate said winding spindle, a spring for disengaging said clutch-means, means for journaling the winding spindle to adapt it to slide longitudinally relatively to the drive-shaft, resilient means of greater force than that of the clutch-disengaging spring for holding a bobbin engaged with the spindle to be driven thereby, means to release said resilient means to permit the spindle to slide under the force of the spring in the clutch-means to disengage the latter and arrest the rotation of the winding spindle, means operative upon completion of each bobbin to release the resilient bobbin-holding means to doff said bobbin from the spindle, and means for donning a new bobbin in connection with the spindle and applying the resilient holding means thereto to cause engagement of the clutch-means for restarting winding on said new bobbin.

5. In a winding machine, a winding spindle journaled in bearings to adapt it to slide longitudinally thereof, a drive-shaft journaled in axial alinement with the spindle at one end thereof, a clutch-member on said drive-shaft, a clutch-member on the spindle engageable with the clutch-member on the drive-shaft for rotating said spindle, a spring between said clutch-members for normally maintaining them disengaged, means at the opposite end of the spindle for receiving a bobbin to rotate it therefrom, means for engaging the opposite end of said bobbin, resilient means for actuating said last-named bobbin-engaging means to cause the bobbin to slide the spindle and engage the clutch-members, means for releasing the pressure of said resilient means to permit the spindle to slide to a limited extent under the tension of the spring in the clutch to disengage the clutch-members and arrest the rotation of the spindle, means operated automatically upon completion of a bobbin for releasing the bobbin-engaging means to doff said bobbin from the spindle, means to don a new bobbin in connection with said spindle, and means for applying said resilient means to the new bobbin to slide the spindle and engage the clutch-member to restart the winding operation.

6. In a winding machine, a drive-shaft, a winding spindle separate from the drive-shaft and extending axially relatively thereto, clutch-means for connecting the drive-shaft to rotate the spindle, means for journaling the spindle to adapt it to slide relatively to the drive-shaft, a driver-chuck on the end of the winding spindle for receiving the head of a bobbin, a slidable tail-stock, a chuck on said tail-stock for engaging the tip end of the bobbin, a spring for sliding the tail-stock to cause the chuck to press against the end of the bobbin and hold the spindle with the clutch-means engaged, means for restraining said spring to allow the tail-stock to slide and relieve the pressure of the chuck on the end of the bobbin, a spring for sliding the spindle to disengage the clutch-means when the first-named spring is restrained whereby to arrest the rotation of the winding spindle, means acting automatically upon completion of winding a bobbin to release the pressure of the spring on the tail-stock to doff said bobbin from the spindle, means to don a fresh bobbin in connection with the tail-stock, and means to apply the pressure of the first-named spring to said tail-stock to slide the spindle for re-engaging the clutch-means.

7. In a winding machine, a winding spindle, means for rotating said spindle, means for connecting a bobbin for rotation by said spindle, a traverse-cam rotatably mounted on the winding spindle, gearing for driving said cam from the winding spindle, a threaded rod reciprocable by the traverse-cam, a yarn-guide having means engaging the threads on the rod to cause it to be reciprocated thereby, a one-way clutch for rotating said rod to advance the yarn-guide along the bobbin, and means driven by the traverse-cam to actuate the one-way clutch for turning the rod to feed the yarn-guide during its reciprocation.

8. In a winding machine, a winding spindle, means for rotating said spindle, means for connecting a bobbin for rotation by said spindle, a yarn-guide for traversing yarn on the bobbin, a traverse-rod having a screw-threaded connection with the yarn-guide, means to reciprocate the rod, a one-way clutch for rotating said rod to feed the yarn-guide outwardly along the bobbin, and means driven with the winding spindle to actuate the one-way clutch to turn the threaded rod and advance the guide.

9. In a winding machine, a rotary winding spindle, means for driving said winding spindle, means to connect a bobbin for rotation by said winding spindle, a traverse-cam, a traverse-rod reciprocated by said cam and formed with screw-threads, a yarn-guide engageable with the screw-threads on said rod to cause it to be reciprocated thereby, a one-way clutch for rotating the traverse-rod to feed the yarn-guide lengthwise of the bobbin, a lever for actuating the one-way clutch, and an eccentric rotated with the cam for oscillating said lever.

10. In a winding machine, a rotary winding spindle, means for rotating said winding spindle, means to connect a bobbin for rotating it by said spindle, a traverse-cam rotatably mounted on said spindle, gearing connecting the spindle to rotate said cam, a traverse-rod reciprocated by the cam and formed with screw-threads, a yarn-guide engageable with the screw-threads on the rod to cause it to be reciprocated by said rod, a one-way clutch, gearing connecting said clutch to rotate the traverse-rod to advance the guide along the bobbin, a lever for actuating the one-way clutch, and an eccentric rotated with the cam for oscillating said lever.

11. In a winding machine, a rotary winding spindle, means for rotating said spindle, means for connecting a bobbin for rotation by said spindle, a reciprocable screw-threaded traverse-rod, means to reciprocate the traverse-rod, a yarn-guide threadably connected to said traverse-rod for reciprocation thereby, means for arresting the rotation of the winding spindle and reciprocation of the traverse-rod, detent-means for maintaining said rotating means and reciprocating means in operation, means to rotate the traverse-rod for feeding the yarn-guide along the length of the bobbin, means actuated by the yarn-guide as it reaches the end of its advance along the bobbin for releasing the detent-means to cause arrest of the rotation of the spindle and reciprocation of the traverse-rod, cam-means for disconnecting the yarn-guide from the threads on the traverse-rod, a member slidable in opposite directions along the traverse-rod and carrying said cam-means, means on said member for positively engaging the yarn-guide as it slides in one direction for returning it to initial position for starting the winding of a new bobbin, and means for re-connecting the yarn-guide to the traverse-rod and starting the means for rotating the winding spindle and the means for reciprocating the traverse-rod.

12. In a winding machine, a rotary winding spindle, means for rotating said spindle, means for mounting a bobbin for rotation by said spindle, a reciprocable transverse-rod, means to reciprocate the rod, a yarn-guide releasably connected to said rod for reciprocation thereby, means to feed the guide along the rod during its reciprocation to advance it longitudinally of the bobbin, detent-means for maintaining the spindle-rotating means and rod-reciprocating means in operation, means actuated by the yarn-guide as it reaches the end of its advance along the bobbin to release said detent-means and arrest the spindle-rotating means and rod-reciprocating means, cam-means operated concurrently with the release of the detent-means for disconnecting the yarn-guide from the traverse-rod, a member slidable in a path parallel to said tranverse-rod and carrying said cam-means for disconnecting the yarn-guide from the traverse-rod, said member also having means engageable positively with the yarn-guide for returning it along the rod to initial winding position, means for doffing a wound bobbin from the winding spindle and donning an empty bobbin in connection therewith, means for starting the operation of the spindle-rotating means and rod-reciprocating means, and means for resetting the detent-means to maintain said last-named means in operation.

13. In a winding machine, means for rotating a bobbin, a yarn-guide for distributing yarn on the bobbin, means for reciprocating said yarn-guide to traverse the yarn on the bobbin, means for feeding the yarn-guide along the bobbin to advance its zone of traverse, detent-means for maintaining said bobbin-rotating means and yarn reciprocating means in operation, and means actuated by repeated traversing strokes of the yarn-guide as it approaches the end of the bobbin for releasing said detent-means to cause arrestment of the bobbin-rotating means and guide-reciprocating means.

14. In a winding machine, means for rotating a bobbin, a yarn-guide for distributing yarn on the bobbin, means for reciprocating the yarn-guide to traverse the yarn on the bobbin, means for feeding the guide along the bobbin, driving means for operating the bobbin-rotating means and guide-reciprocating means, detent-means for maintaining said driving means in operation, a trip-device for holding the detent-means operative, and means engageable by the yarn-guide during several repeated traversing strokes of said guide as it approaches the end of its advance along the bobbin to release the trip-device and free the detent-means to render the bobbin-rotating means and guide-reciprocating means inoperative.

15. In a winding machine, means for rotating a bobbin, a yarn-guide for distributing yarn on the bobbin, means to reciprocate said yarn-guide to traverse the yarn on the bobbin, detent-means for maintaining said bobbin-rotating means and guide-reciprocating means operative, a trip-element, means engageable with the trip-element to latch the detent-means in operative relationship, means to feed the yarn-guide along the bobbin to advance its zone of traverse, and means engaged repeatedly by the yarn-guide during several strokes of said guide as it approaches the end of its advance to release the latching means from the trip-element and thereby render the detent-means inoperative.

16. In a winding machine, means for rotating a bobbin, a yarn-guide for distributing yarn on the bobbin, means for reciprocating said yarn-guide to traverse the yarn on the bobbin, detent-means for maintaining the bobbin-rotating means and guide-reciprocating means operative, means to feed the guide lengthwise of the bobbin to advance its zone of traverse, a trip-element provided with a plurality of steps, latching means engageable progressively with said steps to maintain the detent-means operative, and means engageable by the yarn-guide as it approaches the end of the bobbin to disengage the latching means progressively from the steps on the trip-element to finally release the detent-means and arrest the rotation of the bobbin and reciprocation of the yarn-guide.

17. In combination, winding means for rotating a bobbin, a yarn-guide, means to reciprocate said guide for traversing the yarn on the bobbin, means for feeding the yarn-guide along the bobbin to progressively advance its zone of traverse, detent-means for maintaining the bobbin-rotating means and guide-traversing means operative, a member for releasing the detent-means, a trip-element, latching means engageable with the trip-element for maintaining the detent-releasing member inoperative, and means engageable by the yarn-guide during repeated transversing strokes of the guide as it approaches the end of its advance to disengage the latching means from the trip-element and cause the detent-releasing member to act to arrest the operation of the winding means.

18. In a winding machine, means for rotating a bobbin, a yarn-guide for traversing yarn on the bobbin, means for reciprocating said yarn-guide and feeding it along the bobbin, detent-means for maintaining the bobbin-rotating means and guide-reciprocating means operative, a trip-element, a rod rockable for releasing the detent-means, means to rock said rod, means connected to said rod and engageable with the trip-plate to prevent it from rocking for releasing the detent-means, and means actuated by repeated strokes of the yarn-guide as it approaches the end of its adavnce along the bobbin to release the latching means and allow the rod to rock to free the detent-means for arresting the operating of the bobbin-rotating means and guide-reciprocating means.

19. In a winding machine, means for rotating a bobbin, a yarn-guide for traversing yarn on the bobbin, means for reciprocating said guide, means for feeding the yarn-guide along the bobbin to progressively advance its zone of traverse, detent-means for maintaining the bobbin-rotating means and guide-reciprocating means operative, a rockable member for releasing the detent-means, a trip-element having a series of steps, latching means engageable with the first step on the trip-element, means engageable by the yarn-guide as it approaches the end of its advance along the bobbin to release said latching means from said first step on the trip-element to adapt it to engage with the second step in the series, and means carried into position by said release of the latching means from the first step to adapt it to be engaged by the yarn-guide for moving the latching means to a sufficient extent during the next reciprocation of said guide to release the latching means and effect release of the detent-means for arresting the bobbin-rotating means and guide-reciprocating means.

20. In a winding machine, means for rotating a bobbin, a yarn-guide for distributing yarn on the bobbin, means for reciprocating said guide to traverse the yarn on the bobbin, detent-means for maintaining the bobbin-rotating means and guide-reciprocating means operative to wind a bobbin, stopping means operative upon release of the detent-means to arrest the operation of the bobbin-rotating means and guide-reciprocating means, means to advance the guide along the bobbin, a trip-plate provided with a series of steps, latching means engageable with the first step in said series to hold the detent-releasing means inoperative, means engageable by the yarn-guide as it approaches the end of its advance along the bobbin to disengage the latching means from the first step in the series and cause it to be engaged with the second step, and a pawl pivoted to the disengaging means and extending rearwardly therefrom, said pawl being adapted to be engaged by the yarn-guide during a subsequent reciprocation thereof to move the latch-disengaging means to an increased extent for releasing the trip-plate engaging means, and means operative thereby to release the detent-means to cause the stopping means to act to arrest the operation of the bobbin-rotating means and guide-reciprocating means.

21. In a winding machine, a slidable spindle for rotating a bobbin, driving means for rotating the spindle, means for engaging the bobbin with the end of the spindle to maintain the latter in engagement with the driving means, means for donning a bobbin in position for engaging the winding spindle, a reciprocating yarn-guide for traversing yarn on the bobbin, means for feeding said yarn-guide along the bobbin, means for doffing the bobbin from the spindle, means operative to release the winding spindle from the driving means as the bobbin is doffed from said spindle, cycling means for operating the donning and doffing means, and means actuated by repeated strokes of the yarn-guide as it approaches the end of its advance along the bobbin to initiate the operation of the cycling means.

22. In a winding machine, means for rotating a bobbin to wind yarn thereon, a yarn-guide for traversing the yarn on the bobbin, means for feeding said guide along the bobbin to advance its zone of traverse, means for doffing a wound bobbin from the rotating means, means for donning a new bobbin in connection with the rotating means, a cycling-cam shaft, cams on said shaft for operating the doffing means and donning means, normally disconnected driving means for rotating the cam-shaft, means to connect said driving means to rotate the cam-shaft, means constantly oscillated by said cam-shaft driving means, and means actuated by several repeated strokes of the yarn-guide as it approaches the end of its advance along the bobbin to cause the oscillating means to connect the driving means with the cam-shaft to rotate the latter for one complete revolution for operating the donning and doffing means.

23. In a winding machine, means for rotating a bobbin to wind yarn thereon, means for traversing the yarn to distribute it on the bobbin, means for advancing said guide along the bobbin during its traverse relatively thereto, drive-means for operating the bobbin-rotating means and guide-traversing means, means for donning a bobbin in connection with said rotating means, means for disconnecting the driving means from the bobbin-rotating means and doffing the bobbin therefrom, a cam-shaft, cams on said shaft for operating the bobbin-donning and bobbin-doffing means and the drive-disconnecting means, a driver connectible to the cam-shaft to rotate it, and means actuated by several repeated strokes of the yarn-guide as it approaches the end of its advance along the bobbin to connect said driver to rotate hte cam-shaft for a single revolution and then disconnect the driver from said shaft.

24. In a winding machine, a rotatable and axially-slidable winding spindle, means for connecting a bobbin for rotation by said spindle, driving means engageable with said spindle for rotating it, means to apply pressure on the bobbin to cause it to slide the spindle to connect it with said driving means, means for donning a bobbin in connection with the spindle, means for doffing the bobbin from said spindle, a cycling-cam shaft, a cam rotatable by said shaft for releasing the pressure on the bobbin to disengage the spindle from its driving means, a cam on said shaft for operating the donning means, a driver for the cam-shaft, a clutch for connecting said driver to rotate the cam-shaft through one complete revolution, and means actuated by several repeated strokes of the yarn-guide as it approaches the end of its advance along the bobbin to initiate the operation of the cam-shaft by connecting the driver with said clutch.

25. In a winding machine, a winding spindle for rotating a bobbin, a yarn-guide for traversing yarn on said bobbin, means for reciprocating said guide, driving means for rotating the winding spindle and operating the guide-reciprocating means, donning means for connecting a bobbin for rotation by the winding spindle, doffing means for releasing the bobbin from the winding spindle, a cycling-cam shaft, a cam on said cam-shaft for disconnecting the driving means to arrest the rotation of the spindle and reciprocation of the guide, said cam also acting to operate the doffing means, a second cam on said shaft for operating the donning means, a driver for rotating the cam-shaft through one complete revolution, means for advancing the guide along the bobbin, and means actuated by engagement of said guide therewith during several repeated strokes thereof as it reaches the end of its advance for connecting the driver to rotate the cam-shaft.

26. In a winding machine, means for rotating a bobbin, a yarn-guide for traversing yarn to distribute it on said bobbin, means for donning a bobbin in connection with said rotating means, means for releasing the bobbin from the rotating means to doff it from the machine, a cam-shaft, cams on said shaft for operating the donning and doffing means, a driver for rotating said cam-shaft, detent-means for normally maintaining said driver free to rotate relatively to said shaft, means for feeding the yarn-guide along the bobbin during its traverse relatively thereto, means actuated by engagement of the yarn-guide therewith during several repeated strokes of said guide as it approaches the end of its advance along the bobbin to release said detent-means, and means operative upon release of the detent-means to connect the driver to rotate said cam-shaft.

27. In a winding machine, means for rotating a bobbin to wind yarn thereon, means for traversing the yarn to distribute it on the bobbin, means for donning a bobbin in connection with said rotating means, means to disconnect the bobbin from the rotating means to doff it, a cam-shaft, cams on said shaft for operating the bobbin-donning and bobbin-doffing means, a driver free to rotate relatively to the cam-shaft, a clutch for rotating the cam-shaft, a slidable pin for connecting said clutch with the driver to cause the latter to rotate the cam-shaft, said pin having a helical slot in its periphery, a spring for sliding the pin, and a lever engageable with the slot in the pin to retract the latter against the pressure of its spring for disconnecting the clutch from the driver.

28. In a winding machine, means for rotating a bobbin, a reciprocating yarn-guide for traversing yarn on said bobbin, donning means for connecting a bobbin with said rotating means, doffing means for releasing the bobbin from the winding means, a cam-shaft, cams on said shaft for operating the donning and doffing means, a driver free to turn relatively to said cam-shaft and provided with a plurality of circumferential openings, a clutch-disk fast on said shaft, a pin slidable on the clutch-disk to engage an opening in the driver for connecting the latter to rotate the cam-shaft, a helical slot in said pin, a spring for sliding the pin to engage it with an opening in the driver, a rockable lever having a tapered end for engaging the slot in the pin to retract the pin for disengaging the clutch-disk from the driver, and means operated automatically upon completion of winding a bobbin to release the lever from the clutch-pin to cause the pin to engage the driver for rotating the cam-shaft.

29. In a winding machine, means for rotating a bobbin to wind yarn thereon, traversing means for distributing the yarn on said bobbin, means for doffing the bobbin from said rotating means, means for donning a fresh bobbin in connection with said rotating means, cams for operating said doffing and donning means, a driver for rotating said cams, a clutch-disk connected to said driver, a second clutch-disk connected to rotate the cams, a pin on one clutch-disk slidable to engage an opening in the opposite disk for connecting the disks, said pin having an inclined peripheral slot, resilient means for sliding said pin to connect the two clutch-disk, a member normally engaging with the slot in the pin to maintain the clutch-disks disconnected, and means operative upon completion of winding a bobbin to release said member from the slot in the pin to connect the clutch-disks for rotating said cams.

30. In a winding machine, a rotatable and slidable winding spindle, driving means for rotating said spindle, means for engaging a bobbin with said spindle, means to apply pressure to said bobbin to slide the spindle for connecting it with the driving means, detent-means for maintaining the pressure means acting on the bobbin, means to release the detent-means, a slidable member for releasing the pressure on the bobbin, resilient means for sliding the spindle to release it from its driving means and arrest the rotation of the bobbin, a cam engageable with said slidable member to move the latter for releasing the pressure means to doff the bobbin from the winding spindle, means for donning a new bobbin in connection with the winding spindle, means for operating said slidable member to return the pressure means into operation for sliding the spindle to connect it with the driving means, and means for re-engaging the detent-means.

31. In a winding machine, a rotatable and slideable winding spindle, driving means for rotating said spindle, means for connecting a bobbin with the end of the spindle for rotation thereby, pressure-means for forcing said bobbin against the end of the spindle to slide it into connection with said driving means, a slidable rod for releasing the pressure-means from the bobbin, resilient means for sliding the spindle to release it from the driving means upon release of the pressure-means, detent-means for latching said rod in position with the pressure-means acting against the bobbin, a lever for sliding the rod to release the pressure-means, a cam for actuating said lever for sliding said rod upon release of the detent-means to entirely remove the pressure-means from the bobbin to cause it to be doffed from the winding spindle, means for donning a fresh bobbin in connection with said winding spindle, means for restoring said pressure-means to act against the end of the bobbin, and means for re-engaging said detent-means to latch said rod in position with the pressure-means acting against the bobbin.

32. In a winding machine, means for rotating a bobbin to wind yarn thereon, a yarn-guide for traversing the yarn to distribute it on the bobbin, means for reciprocating the yarn-guide, means for feeding the guide along the bobbin to advance its zone of traverse, means for releasing said guide from its reciprocating means at the completion of winding a bobbin, a slidable member, means to slide said member in opposite directions, latching means on said member for engaging the yarn-guide to return it to first position for winding a new bobbin, and means for disconnecting said latching means from the guide at the end of its movement for returning the guide.

33. In a winding machine, means for rotating a bobbin to wind yarn thereon, a reciprocating traverse-rod provided with screw-threads, a reciprocable yarn-guide having means engaging said threads on the traverse-rod, means to rotate the rod to feed the guide along the rod during its reciprocation to advance its zone of traverse, a member travelable adjacent the path of reciprocation of said rod, cam-means on said travelable member engageable with the yarn-guide to release it from the threads on the traverse-rod, and means for traveling said member to carry the guide back to its initial winding position to start the winding of a new bobbin.

34. In a winding machine, means for rotating a bobbin, a yarn-guide for traversing yarn on said bobbin, means to feed the guide along the bobbin to advance its zone of traverse, a guide-retrieving member slidable for returning the guide to first position after the completion of winding a bobbin, a pivoted bunch-builder at the head end of said bobbin, means on said retriever-member engageable with the bunch-builder to shift it into operative position for engaging the yarn to restrict its traverse at the beginning of winding a bobbin, a spring for shifting said bunch-builder into inoperative position upon ts release from the traveling member, a latch engageable with said bunch-builder to hold it in operative position, means for donning a bobbin in connection with the winding means, and means operated by said donning means during its return to initial position to release the latch and allow the bunch-builder to return to inoperative position under the action of its spring.

35. In a winding machine, means for rotating a bobbin to wind yarn thereon, a yarn-guide for distributing the yarn on the bobbin, means for reciprocating said yarn-guide comprising a screw-threaded rod, means on said guide engaging the threads on the rod, a one-way clutch for rotating the rod to feed the guide therealong to advance its zone of traverse, a gear for rotating said clutch, a quadrant for rotating said gear, and a cam for oscillating the quadrant to actuate the clutch for rotating the rod.

36. In a winding machine, a spindle for rotating a bobbin, means for journaling said spindle to adapt it to slide longitudinally therein, driving means for rotating said spindle, means to slide the spindle to connect it with said driving means, means to slide said spindle in the opposite direction to disconnect it from the driving means, an annulus rotatable by said spindle and a brake-shoe having friction means engageable with said annulus for arresting rotation of the spindle when said spindle is slid to release it from the driving means.

37. In a winding machine, a rotary winding spindle, driving means for rotating said spindle, means to journal said spindle to adapt it to slide axially, means for sliding said spindle to engage it with the driving means, means to slide the spindle in the opposite direction to release it from the driving means, an annular member carried at one end of said spindle for rotation therewith, and a stationary brake-shoe frictionally engageable with the rim of said rotary member to arrest the rotation of the spindle when it is slid to release it from the driving means.

38. In a winding machine, means for rotating a bobbin to wind yarn thereon, means for doffing a wound bobbin from said rotating means and donning a new bobbin in connection therewith, cycling means for operating said doffing and donning means upon completion of each bobbin wound in the machine, means for initiating the operation of said cycling means, a magazine for supplying bare bobbins to the donning means, means adapted to be weighted by a bobbin delivering from the magazine for setting the cycling means in condition for operation, and means to prevent operation of the cycling means in the absence of a bobbin delivering from the magazine.

39. In a winding machine, means for rotating a bobbin to wind yarn thereon, means for donning a bobbin in connection with said rotating means, means for doffing a wound bobbin from said rotating means, a yarn-guide for distributing the yarn on the bobbin, a magazine for supplying bare bobbins to the donning means, cycling means for operating the doffing and donning means to discharge a wound bobbin and replace it with a bare bobbin, means operated by the yarn-guide upon completion of winding a bobbin to initiate operation of the cycling means, and means engaged by a bobbin ready for delivery from the magazine to set it in position for causing actuation of the means for initiating operation of the cycling means.

40. In a winding machine having means for rotating a bobbin, a reciprocating thread-guide for traversing yarn on the bobbin, and means for doffing a wound bobbin and donning a bare bobbin in substitution therefor, the combination therewith of a travelable retriever-clip engageable with said yarn-guide upon completion of winding a bobbin, and means for traveling said retriever-clip to return the yarn-guide to initial winding position comprising a slidable rack-bar, means for longitudinally sliding said bar, a pinion journaled with its teeth in mesh with the teeth on said slidable rack-bar, a gear connected for rotation by said pinion, and a second rack-bar connected to the retriever-clip and arranged with its teeth in mesh with the teeth on the gear driven from said pinion to multiply the motion of the retriever-clip.

41. In a winding machine comprising means for rotating a bobbin to wind yarn thereon, means for traversing the yarn on said bobbin, means for doffing a wound bobbin and donning a bare bobbin in substition therefor, the combination therewith of a pair of yarn-clips travelable in opposite directions, one of said clips acting to seize the trailing length of yarn from the doffed bobbin and sever it from the supply yarn, said other clip acting to seize the supply-yarn and carry its severed end to the head end of the bobbin for attachment thereto, and means for traveling said clips including a reciprocable gear-rack, pinions meshing with the teeth of said gear-rack, gears rotatable by said pinions, and a rack-bar on each side of the axis of said gears with its teeth meshing with the teeth on one of the gears, one of said bars being connected to the first-named clip and the other bar connected to the other clip for traveling said clips.

References Cited in the file of this patent
UNITED STATES PATENTS

| | | |
|---|---|---|
| 1,959,567 | Brugger | May 22, 1934 |
| 2,234,355 | Reiners | Mar. 11, 1941 |
| 2,247,718 | Treckmann | July 1, 1941 |
| 2,257,651 | Reynolds | Sept. 30, 1941 |
| 2,306,268 | Kimpton | Dec. 22, 1942 |
| 2,609,156 | Kimpton | Sept. 2, 1952 |
| 2,657,867 | Furst | Nov. 3, 1953 |